(12) United States Patent
Wedding et al.

(10) Patent No.: US 9,013,102 B1
(45) Date of Patent: Apr. 21, 2015

(54) RADIATION DETECTOR WITH TILED SUBSTRATES

(75) Inventors: Daniel K. Wedding, Toledo, OH (US);
Carol Ann Wedding, Toledo, OH (US);
Oliver M. Strbik, III, Holland, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 625 days.

(21) Appl. No.: 13/419,782

(22) Filed: Mar. 14, 2012

Related U.S. Application Data

(63) Continuation-in-part of application No. 12/780,990, filed on May 17, 2010, now abandoned.

(60) Provisional application No. 61/180,842, filed on May 23, 2009.

(51) Int. Cl.
  *H01J 47/00* (2006.01)
  *H01J 47/12* (2006.01)

(52) U.S. Cl.
  CPC ..................... *H01J 47/12* (2013.01)

(58) Field of Classification Search
  USPC ........................................................ 250/374
  See application file for complete search history.

(56) References Cited

U.S. PATENT DOCUMENTS

| | | | |
|---|---|---|---|
| 2,152,999 A | 4/1939 | Milner | |
| 2,187,432 A | 1/1940 | Powers | |
| 2,298,581 A | 10/1942 | Abadie | |
| 2,644,113 A | 6/1953 | Etzkorn | |
| 3,050,654 A | 8/1962 | Toulon | |
| 3,177,161 A | 4/1965 | Smith-Johannsen | |
| 3,264,073 A | 8/1966 | Schmitt | |
| 3,365,315 A | 1/1968 | Beck et al. | |
| 3,423,489 A | 1/1969 | Arens | |
| 3,515,932 A | 6/1970 | King | |
| 3,528,809 A | 9/1970 | Farnand | |
| 3,602,754 A | 8/1971 | Pfaender et al. | |
| 3,607,169 A | 9/1971 | Coxe | |
| 3,646,384 A | 2/1972 | Lay | |
| 3,652,891 A | 3/1972 | Janning | |
| 3,654,680 A | 4/1972 | Bode et al. | |
| 3,666,981 A | 5/1972 | Lay | |
| 3,674,461 A | 7/1972 | Farnand | |
| 3,699,050 A | 10/1972 | Henderson | |
| 3,755,027 A | 8/1973 | Gilsing | |
| 3,769,543 A | 10/1973 | Pennebaker | |
| 3,792,136 A | 2/1974 | Schmitt | |
| 3,793,041 A | 2/1974 | Sowman | |
| 3,811,061 A | 5/1974 | Nakayama et al. | |
| 3,838,307 A | 9/1974 | Masi | |
| 3,838,998 A | 10/1974 | Matthews et al. | |
| 3,848,248 A | 11/1974 | MacIntyre | |
| 3,860,846 A | 1/1975 | Mayer | |
| 3,873,870 A | 3/1975 | Fukushima et al. | |
| 3,885,195 A | 5/1975 | Amano | |
| 3,886,395 A | 5/1975 | Eukushima et al. | |
| 3,914,766 A | 10/1975 | Moore | |
| 3,916,584 A | 11/1975 | Howard et al. | |

(Continued)

*Primary Examiner* — Nimeshkumar Patel
*Assistant Examiner* — Jacob R Stern
(74) *Attorney, Agent, or Firm* — Donald K. Wedding

(57) ABSTRACT

Tiled substrates containing hollow gas filled plasma-shells for radiation detecting or sensing. The gas filled plasma-shells are placed on or within the surface of a substrate which may be a printed circuit board. Multiple substrates containing plasma-shells are tiled together edge to edge to form a self-supporting structure such as a dome or hemisphere for radiation detection.

20 Claims, 14 Drawing Sheets

(56) References Cited

U.S. PATENT DOCUMENTS

| | | |
|---|---|---|
| 3,927,342 A | 12/1975 | Bode et al. |
| 3,933,679 A | 1/1976 | Weitzel et al. |
| 3,935,494 A | 1/1976 | Dick et al. |
| 3,954,678 A | 5/1976 | Marquisee |
| 3,964,050 A | 6/1976 | Mayer |
| 3,969,718 A | 7/1976 | Strom |
| 3,975,194 A | 8/1976 | Farnand et al. |
| 3,990,068 A | 11/1976 | Mayer et al. |
| 3,998,618 A | 12/1976 | Kreick et al. |
| 4,027,188 A | 5/1977 | Bergman |
| 4,027,191 A | 5/1977 | Schaufele et al. |
| 4,035,690 A | 7/1977 | Roeber |
| 4,038,577 A | 7/1977 | Bode et al. |
| 4,048,533 A | 9/1977 | Hinson et al. |
| 4,059,423 A | 11/1977 | De Vos et al. |
| 4,075,025 A | 2/1978 | Rostoker |
| 4,106,009 A | 8/1978 | Dick |
| 4,111,713 A | 9/1978 | Beck |
| 4,119,422 A | 10/1978 | Rostoker |
| 4,126,807 A | 11/1978 | Wedding et al. |
| 4,126,809 A | 11/1978 | Wedding et al. |
| 4,133,854 A | 1/1979 | Hendricks |
| 4,163,637 A | 8/1979 | Hendricks |
| 4,164,678 A | 8/1979 | Biazzo et al. |
| 4,166,147 A | 8/1979 | Lange et al. |
| 4,257,798 A | 3/1981 | Hendricks et al. |
| 4,260,994 A | 4/1981 | Parker |
| 4,279,632 A | 7/1981 | Frosch et al. |
| 4,290,847 A | 9/1981 | Johnson et al. |
| 4,303,061 A | 12/1981 | Torobin |
| 4,303,431 A | 12/1981 | Torobin |
| 4,303,432 A | 12/1981 | Torobin |
| 4,303,433 A | 12/1981 | Torobin |
| 4,303,603 A | 12/1981 | Torobin |
| 4,303,729 A | 12/1981 | Torobin |
| 4,303,730 A | 12/1981 | Torobin |
| 4,303,731 A | 12/1981 | Torobin |
| 4,303,732 A | 12/1981 | Torobin |
| 4,303,736 A | 12/1981 | Torobin |
| 4,307,051 A | 12/1981 | Sargeant et al. |
| 4,314,827 A | 2/1982 | Leitheiser et al. |
| 4,322,378 A | 3/1982 | Hendricks |
| 4,344,787 A | 8/1982 | Beggs et al. |
| 4,349,456 A | 9/1982 | Sowman |
| 4,356,429 A | 10/1982 | Tang |
| 4,363,646 A | 12/1982 | Torobin |
| 4,391,646 A | 7/1983 | Howell |
| 4,392,988 A | 7/1983 | Dobson et al. |
| 4,415,512 A | 11/1983 | Torobin |
| 4,459,145 A | 7/1984 | Elsholz |
| 4,494,038 A | 1/1985 | Wedding et al. |
| 4,525,314 A | 6/1985 | Torobin |
| 4,542,066 A | 9/1985 | Delzant |
| 4,547,233 A | 10/1985 | Delzant |
| 4,548,196 A | 10/1985 | Torobin |
| 4,548,767 A | 10/1985 | Hendricks |
| 4,568,389 A | 2/1986 | Torobin |
| 4,582,534 A | 4/1986 | Torobin |
| 4,596,681 A | 6/1986 | Grossman et al. |
| 4,618,525 A | 10/1986 | Chamberlain et al. |
| 4,637,990 A | 1/1987 | Torobin |
| 4,638,218 A | 1/1987 | Shinoda et al. |
| 4,671,909 A | 6/1987 | Torobin |
| 4,713,300 A | 12/1987 | Sowman et al. |
| 4,737,687 A | 4/1988 | Shinoda et al. |
| 4,743,511 A | 5/1988 | Sowman et al. |
| 4,743,545 A | 5/1988 | Torobin |
| 4,744,831 A | 5/1988 | Beck |
| 4,757,036 A | 7/1988 | Kaar et al. |
| 4,777,154 A | 10/1988 | Torobin |
| 4,778,502 A | 10/1988 | Garnier et al. |
| 4,793,980 A | 12/1988 | Torobin |
| 4,797,378 A | 1/1989 | Sowman |
| 4,800,180 A | 1/1989 | McAllister et al. |
| 4,865,875 A | 9/1989 | Kellerman |
| 4,883,779 A | 11/1989 | McAllister et al. |
| 4,886,994 A | 12/1989 | Ragge |
| 4,960,351 A | 10/1990 | Kendall et al. |
| 4,963,792 A | 10/1990 | Parker |
| 5,017,316 A | 5/1991 | Sowman |
| 5,053,436 A | 10/1991 | Delgado |
| 5,055,240 A | 10/1991 | Lee et al. |
| 5,069,702 A | 12/1991 | Block et al. |
| 5,077,241 A | 12/1991 | Moh et al. |
| 5,176,732 A | 1/1993 | Block et al. |
| 5,183,593 A | 2/1993 | Durand et al. |
| 5,185,299 A | 2/1993 | Wood et al. |
| 5,212,143 A | 5/1993 | Torobin |
| 5,225,123 A | 7/1993 | Torobin |
| 5,326,298 A | 7/1994 | Hotomi |
| 5,397,759 A | 3/1995 | Torobin |
| 5,487,390 A | 1/1996 | Cohen et al. |
| 5,514,934 A | 5/1996 | Matsumoto et al. |
| 5,534,348 A | 7/1996 | Miller et al. |
| 5,625,256 A | 4/1997 | Tiedt et al. |
| 5,661,531 A | 8/1997 | Greene et al. |
| 5,668,569 A | 9/1997 | Greene et al. |
| 5,777,436 A | 7/1998 | Lepselter |
| 5,781,258 A | 7/1998 | Dabral et al. |
| 5,793,158 A | 8/1998 | Wedding |
| 5,796,452 A | 8/1998 | Pierson |
| 5,805,117 A | 9/1998 | Mazurek et al. |
| 5,838,405 A | 11/1998 | Izumi et al. |
| 5,867,236 A | 2/1999 | Babuka et al. |
| 5,889,568 A | 3/1999 | Seraphim et al. |
| 5,903,328 A | 5/1999 | Greene et al. |
| 5,929,563 A | 7/1999 | Genz |
| 5,932,968 A | 8/1999 | Ghosh et al. |
| 5,939,826 A | 8/1999 | Ohsawa et al. |
| 5,963,281 A | 10/1999 | Koons et al. |
| 5,984,747 A | 11/1999 | Bhagavatula et al. |
| 6,005,649 A | 12/1999 | Krusius et al. |
| 6,020,868 A | 2/2000 | Greene et al. |
| 6,100,861 A | 8/2000 | Cohen et al. |
| 6,153,123 A | 11/2000 | Hampden-Smith et al. |
| 6,176,584 B1 | 1/2001 | Best et al. |
| 6,184,848 B1 | 2/2001 | Weber |
| 6,208,791 B1 | 3/2001 | Bischel et al. |
| 6,255,777 B1 | 7/2001 | Kim et al. |
| 6,262,696 B1 | 7/2001 | Seraphim et al. |
| 6,368,708 B1 | 4/2002 | Brown et al. |
| 6,380,678 B1 | 4/2002 | Kim |
| 6,380,680 B1 | 4/2002 | Troxler |
| 6,396,985 B2 | 5/2002 | Lowry et al. |
| 6,402,985 B1 | 6/2002 | Hsu et al. |
| 6,418,267 B1 | 7/2002 | Lowry |
| 6,476,783 B2 | 11/2002 | Matthies et al. |
| 6,476,886 B2 | 11/2002 | Krusius et al. |
| 6,498,592 B1 | 12/2002 | Matthies |
| 6,545,412 B1 | 4/2003 | Jang |
| 6,545,422 B1 | 4/2003 | George et al. |
| 6,570,335 B1 | 5/2003 | George et al. |
| 6,571,043 B1 | 5/2003 | Lowry et al. |
| 6,600,144 B2 | 7/2003 | Matthies |
| 6,612,889 B1 | 9/2003 | Green et al. |
| 6,620,012 B1 | 9/2003 | Johnson et al. |
| 6,628,088 B2 | 9/2003 | Kim et al. |
| 6,633,117 B2 | 10/2003 | Shinoda et al. |
| 6,639,643 B2 | 10/2003 | Babuka et al. |
| 6,646,388 B2 | 11/2003 | George et al. |
| 6,650,055 B2 | 11/2003 | Ishimoto et al. |
| 6,677,704 B2 | 1/2004 | Ishimoto et al. |
| 6,678,020 B2 | 1/2004 | Ok et al. |
| 6,680,761 B1 | 1/2004 | Greene et al. |
| 6,683,665 B1 | 1/2004 | Matthies |
| 6,690,337 B1 | 2/2004 | Mayer, III et al. |
| 6,693,684 B2 | 2/2004 | Greene et al. |
| 6,762,550 B2 | 7/2004 | Itaya et al. |
| 6,762,566 B1 | 7/2004 | George et al. |
| 6,764,367 B2 | 7/2004 | Green et al. |
| 6,791,264 B2 | 9/2004 | Green et al. |
| 6,794,812 B2 | 9/2004 | Yamada et al. |
| 6,796,867 B2 | 9/2004 | George et al. |
| 6,801,001 B2 | 10/2004 | Drobot et al. |

(56) References Cited

U.S. PATENT DOCUMENTS

| | | |
|---|---|---|
| 6,822,626 B2 | 11/2004 | George et al. |
| 6,836,063 B2 | 12/2004 | Ishimoto et al. |
| 6,836,064 B2 | 12/2004 | Yamada et al. |
| 6,841,929 B2 | 1/2005 | Ishimoto et al. |
| 6,857,923 B2 | 2/2005 | Yamada et al. |
| 6,864,631 B1 | 3/2005 | Wedding |
| 6,870,519 B2 | 3/2005 | Sundahl |
| 6,881,946 B2 | 4/2005 | Cok et al. |
| 6,893,677 B2 | 5/2005 | Yamada et al. |
| 6,897,855 B1 | 5/2005 | Matthies et al. |
| 6,902,456 B2 | 6/2005 | George et al. |
| 6,914,382 B2 | 7/2005 | Ishimoto et al. |
| 6,930,442 B2 | 8/2005 | Awamoto et al. |
| 6,932,664 B2 | 8/2005 | Yamada et al. |
| 6,935,913 B2 | 8/2005 | Wyeth et al. |
| 6,940,501 B2 | 9/2005 | Seligson |
| 6,969,292 B2 | 11/2005 | Tokai et al. |
| 6,975,068 B2 | 12/2005 | Green et al. |
| 6,999,138 B2 | 2/2006 | Cok |
| 7,005,793 B2 | 2/2006 | George et al. |
| 7,025,648 B2 | 4/2006 | Green et al. |
| 7,049,748 B2 | 5/2006 | Tokai et al. |
| 7,083,681 B2 | 8/2006 | Yamada et al. |
| 7,108,392 B2 | 9/2006 | Strip et al. |
| 7,122,961 B1 | 10/2006 | Wedding |
| 7,125,305 B2 | 10/2006 | Green et al. |
| 7,135,767 B2 | 11/2006 | Wong et al. |
| 7,137,857 B2 | 11/2006 | George et al. |
| 7,140,941 B2 | 11/2006 | Green et al. |
| 7,157,854 B1 | 1/2007 | Wedding |
| 7,176,628 B1 | 2/2007 | Wedding |
| 7,247,989 B1 | 7/2007 | Wedding |
| 7,277,066 B2 | 10/2007 | Sundahl |
| 7,288,014 B1 | 10/2007 | George et al. |
| 7,295,179 B2 | 11/2007 | Dunn |
| 7,307,602 B1 | 12/2007 | Wedding et al. |
| 7,358,929 B2 | 4/2008 | Mueller et al. |
| 7,375,342 B1 | 5/2008 | Wedding |
| 7,394,194 B2 | 7/2008 | Cok |
| 7,405,516 B1 | 7/2008 | Wedding |
| 7,456,571 B1 | 11/2008 | Wedding |
| 7,474,273 B1 | 1/2009 | Pavliscak et al. |
| 7,535,175 B1 | 5/2009 | Strbik, III et al. |
| 7,589,697 B1 | 9/2009 | Guy et al. |
| 7,592,970 B2 | 9/2009 | Matthies et al. |
| 7,595,774 B1 | 9/2009 | Wedding et al. |
| 7,604,523 B1 | 10/2009 | Wedding et al. |
| 7,619,591 B1 | 11/2009 | Guy et al. |
| 7,622,866 B1 | 11/2009 | Wedding et al. |
| 7,628,666 B1 | 12/2009 | Strbik, III et al. |
| 7,638,943 B1 | 12/2009 | Wedding et al. |
| 2001/0028216 A1 | 10/2001 | Tokai et al. |
| 2002/0004111 A1 | 1/2002 | Matsubara |
| 2002/0030437 A1 | 3/2002 | Shimizu et al. |
| 2002/0041156 A1 | 4/2002 | Juestel et al. |
| 2002/0101151 A1 | 8/2002 | Choi et al. |
| 2003/0025440 A1 | 2/2003 | Ishimoto et al. |
| 2003/0052592 A1 | 3/2003 | Shinoda et al. |
| 2003/0094891 A1 | 5/2003 | Green et al. |
| 2003/0122485 A1 | 7/2003 | Tokai et al. |
| 2003/0164684 A1 | 9/2003 | Green et al. |
| 2003/0182967 A1 | 10/2003 | Tokai et al. |
| 2003/0184212 A1 | 10/2003 | Ishimoto et al. |
| 2003/0214243 A1 | 11/2003 | Drobot et al. |
| 2004/0033319 A1 | 2/2004 | Yamada et al. |
| 2004/0051450 A1 | 3/2004 | George et al. |
| 2004/0063373 A1 | 4/2004 | Johnson et al. |
| 2004/0175854 A1 | 9/2004 | George et al. |
| 2004/0198096 A1 | 10/2004 | Kim et al. |
| 2004/0234902 A1 | 11/2004 | Toyoda et al. |
| 2005/0095944 A1 | 5/2005 | George et al. |
| 2005/0134526 A1 | 6/2005 | Willem et al. |
| 2006/0097620 A1 | 5/2006 | George et al. |
| 2006/0158112 A1 | 7/2006 | Hur et al. |
| 2007/0008259 A1 | 1/2007 | Barker |
| 2007/0015431 A1 | 1/2007 | Green et al. |
| 2007/0103583 A1 | 5/2007 | Burnett et al. |
| 2007/0200499 A1 | 8/2007 | Eden et al. |

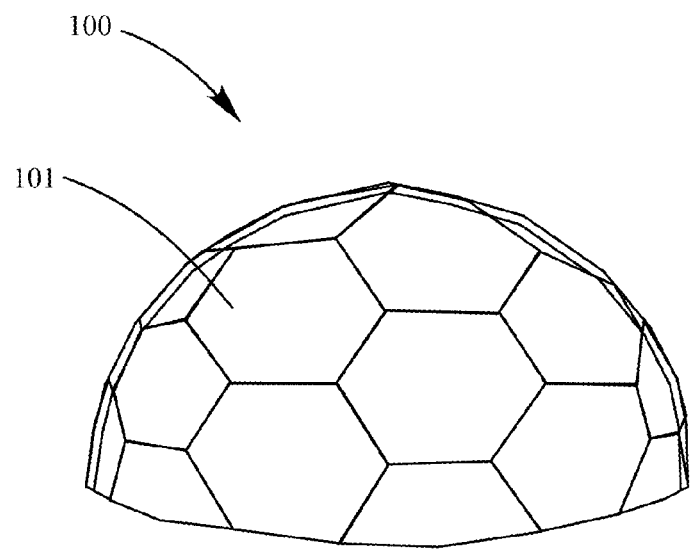
FIG. 1C
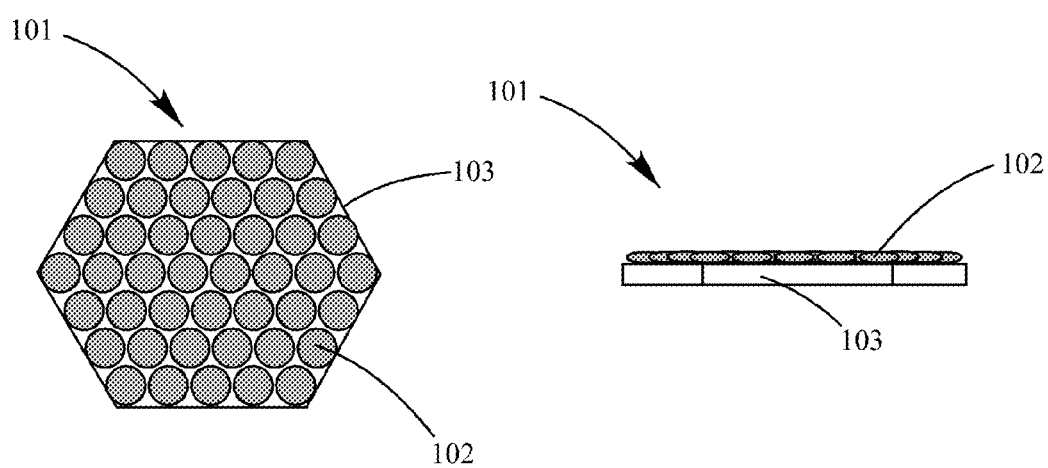
FIG. 1D
FIG. 1E

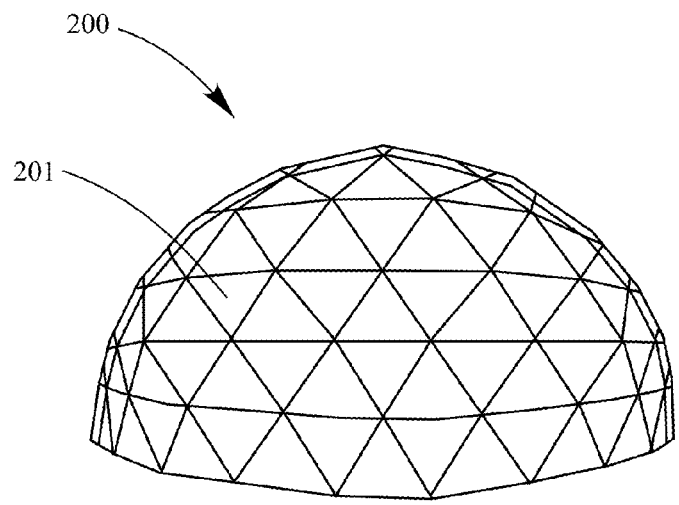
FIG. 2C
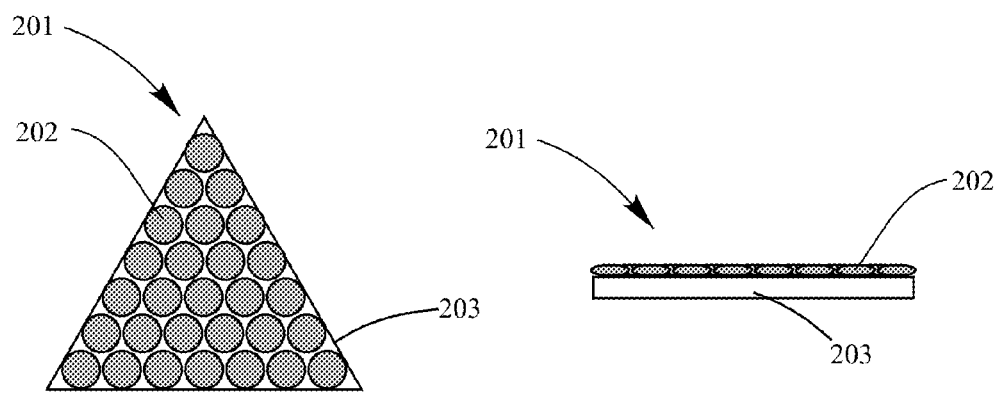
FIG. 2D
FIG. 2E

RADIATION DETECTOR WITH TILED SUBSTRATES

RELATED APPLICATION

This application is a continuation-in-part under 35 U.S.C. 120 of U.S. patent application Ser. No. 12/780,990 filed May 17, 2010 now abandoned with priority claimed under 35 U.S.C. 119(e) from Provisional U.S. Patent Application Ser. No. 61/180,842, filed May 23, 2009, both incorporated herein by reference.

INTRODUCTION

This invention relates to radiation detector or sensor apparatus and method using a gas discharge device such as a plasma display panel (PDP). This invention particularly relates to using a gas discharge device as means of detecting or sensing radiation especially ionizing radiation such as gamma rays from a nuclear source. The gas discharge device used in the practice of this invention comprises one or more plasma-shells that function as radiation detector or sensor shells in the device. The plasma-shell may be of any suitable geometric shape including a plasma-disc, plasma-dome, plasma-sphere, plasma-cube, and plasma-cuboid. The hollow plasma-shell is filled with an ionizable gas and used as a pixel or subpixel in a gas discharge device such as a plasma display panel (PDP). Combinations of two or more different plasma-shells of different geometric shapes may be used. Also combinations of three or more different geometric shapes may be used. This invention is described herein with reference to the use of a plasma-disc alone or in combination with other plasma-shells. Plasma-shells of any given geometric shape may be used in combination with plasma-shells of any other geometric shape. Each radiation detection plasma-shell may be electrically connected to one or more conductors or electrodes which may be connected to a radiation read-out and/or recording device.

In one embodiment, this invention relates to tiling of single substrates containing hollow, gas filled encapsulated plasma-shells. The gas filled plasma-shells are placed on or within the surface of a substrate which may be a printed circuit board. Each tiled substrate comprises one or more plasma-shells. Multiple substrates are tiled together to form a structure of a desired shape such as a dome or hemisphere. The tiled structure may be used for a variety of applications including gas discharge displays, antenna, solar photovoltaic cells, and radiation detectors. The tiled substrates are described herein for the manufacture of gas discharge radiation detectors.

Triangular and hexagonal substrate tiles used alone or in combination are especially useful in fabricating because a three-dimensional structure such as a dome. Such allow easy assembly of a domed net shape using the same repeating pattern of the tile. Other tiled substrate geometric shapes are contemplated including cylinders, cubes, or other three-dimensional shapes. Large flat structures may also be constructed using tiled substrates. In addition to the triangular and hexagonal shaped tiles, other polygonal tile shapes are contemplated including square tiles, rectangular tiles, and pentagonal tiles.

BACKGROUND

In a display application, the tiled display uses the plasma-shells as pixel elements. The plasma-shells are encapsulated hollow gas filled shells. When a voltage is applied across the plasma-shell, the gas ionizes and glows. Depending on the type of ionized gas, the gas discharge will emit light in the UV, visible, and/or infrared regions. The ionized gas can be used alone or in combination with a luminescent material to achieve light emission in the UV, visible, and/or infrared region. Each plasma-shell may be of any suitable geometric shape, such as a plasma-sphere, plasma-disc, and/or plasma-dome.

A gas discharge plasma display panel (PDP) comprises a multiplicity of single addressable picture elements, each element referred to as a pixel or cell. The electrodes are generally grouped in a matrix configuration to allow for selective addressing of each pixel or cell. In a multicolor PDP, two or more pixels or cells may be addressed as sub-pixels or sub-cells to form a single pixel or cell. As used herein, pixel or cell means sub-pixel or sub-cell. The pixel or cell element is defined by two or more electrodes positioned in such a way so as to provide a voltage potential across a gap containing an ionizable gas. When sufficient voltage is applied across the gap, the gas ionizes and discharges to produce light. In an AC gas discharge plasma display, the electrodes at a pixel site are insulated from the gas with a dielectric. In a DC gas discharge one or more of the electrodes is in contact with the gas.

Several types of voltage pulses may be applied across an AC gas discharge plasma display cell gap to form a display image. These pulses include a write pulse, a sustain pulse, and an erase pulse. The write pulse is of a sufficient voltage potential to ionize the gas at the pixel site and is selectively applied across selected pixel sites. The ionized gas will produce visible light and/or invisible light such as UV, which excites a phosphor to glow. In an AC gas discharge, sustain pulses are a series of pulses that produce a voltage potential across pixels to maintain ionization of pixels previously ionized. An erase pulse is used to selectively extinguish ionized pixels.

The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display, it is desired that the various physical parameters adhere to required tolerances. Maintaining the required tolerance depends on display structure, cell geometry, fabrication methods, and the materials used. The prior art discloses a variety of plasma display structures, cell geometries, methods of construction, and materials.

AC PDP

AC gas discharge devices include both monochrome (single color) AC plasma displays and multicolor (two or more colors) AC plasma displays. Examples of monochrome AC gas discharge (plasma) displays are well known in the prior art and include those disclosed in U.S. Pat. No. 3,559,190 (Bitzer et al.), U.S. Pat. No. 3,499,167 (Baker et al.), U.S. Pat. No. 3,860,846 (Mayer), U.S. Pat. No. 3,964,050 (Mayer), U.S. Pat. No. 4,080,597 (Mayer), U.S. Pat. No. 3,646,384 (Lay), and U.S. Pat. No. 4,126,807 (Wedding), all incorporated herein by reference. Examples of multicolor AC plasma displays are well known in the prior art and include those disclosed in U.S. Pat. No. 4,233,623 (Pavliscak), U.S. Pat. No. 4,320,418 (Pavliscak), U.S. Pat. No. 4,827,186 (Knauer et al.), U.S. Pat. No. 5,661,500 (Shinoda et al.), U.S. Pat. No. 5,674,553 (Shinoda et al.), U.S. Pat. No. 5,107,182 (Sano et al.), U.S. Pat. No. 5,182,489 (Sano), U.S. Pat. No. 5,075,597 (Salavin et al.), U.S. Pat. No. 5,742,122 (Amemiya et al.), U.S. Pat. No. 5,640,068 (Amemiya et al.), U.S. Pat. No.

5,736,815 (Amemiya), U.S. Pat. No. 5,541,479 (Nagakubi), U.S. Pat. No. 5,745,086 (Weber), and U.S. Pat. No. 5,793,158 (Wedding), all incorporated herein by reference.

This invention is described herein with reference to AC plasma displays. The PDP industry has used two different AC plasma display panel (PDP) structures, the two-electrode AC columnar discharge structure and the three-electrode AC surface discharge structure. Columnar discharge is also called co-planar discharge.

Columnar AC PDP

The two-electrode columnar or co-planar discharge plasma display structure is disclosed in U.S. Pat. No. 3,499,167 (Baker et al.) and U.S. Pat. No. 3,559,190 (Bitzer et al.). The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge PDP structure has been widely used in monochrome AC plasma displays that emit orange or red light from a neon gas discharge. Phosphors may be used in a monochrome structure to obtain a color other than neon orange.

In a multicolor columnar discharge PDP structure as disclosed in U.S. Pat. No. 5,793,158 (Wedding), phosphor stripes, or layers are deposited along the barrier walls and/or on the bottom substrate adjacent to and extending in the same direction as the bottom electrode. The discharge between the two opposite electrodes generates electrons and ions that may bombard and deteriorate the phosphor thereby shortening the life of the phosphor and the PDP.

In a two electrode columnar discharge PDP as disclosed by Wedding (158), each light-emitting pixel is defined by a gas discharge between a bottom or rear electrode x and a top or front opposite electrode y, each cross-over of the two opposing arrays of bottom electrodes x and top electrodes y defining a pixel or cell.

Surface Discharge AC PDP

The three-electrode multicolor surface discharge AC plasma display panel structure is widely disclosed in the prior art including U.S. Pat. No. 5,661,500 (Shinoda et al.), U.S. Pat. No. 5,674,553 (Shinoda), U.S. Pat. No. 5,745,086 (Weber), and U.S. Pat. No. 5,736,815 (Amemiya), all incorporated herein by reference.

In a surface discharge PDP, each light-emitting pixel or cell is defined by the gas discharge between two electrodes on the top substrate. In a multicolor RGB display, the pixels may be called sub-pixels or sub-cells. Photons from the discharge of an ionizable gas at each pixel or sub-pixel excite a photoluminescent phosphor that emits red, blue, or green light.

In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also referred to as a row sustain electrode because it functions to address a pixel and sustain the gas discharge. The opposing electrode on the opposite rear or bottom substrate is a column data electrode and is used to periodically address a row scan electrode on the top substrate. The gas discharge takes place between the row scan and bulk sustain electrodes on the top viewing substrate. The sustaining voltage is applied to the bulk sustain and row scan electrodes on the top substrate.

In a three-electrode surface discharge AC plasma display panel, the sustaining voltage and resulting gas discharge occurs between the electrode pairs on the top or front viewing substrate above and secluded from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode.

DC PDP

This invention may be practiced in a DC gas discharge (plasma) display which is well known in the prior art, for example as disclosed in U.S. Pat. No. 3,788,722 (Milgram), U.S. Pat. No. 3,886,390 (Maloney et al.), U.S. Pat. No. 3,886,404 (Kurahashi et al.), U.S. Pat. No. 4,035,689 (Ogle et al.), U.S. Pat. No. 4,297,613 (Aboelfotoh), U.S. Pat. No. 4,329,626 (Hillenbrand et al.), U.S. Pat. No. 4,340,840 (Aboelfotoh et al.), U.S. Pat. No. 4,532,505 (Holz et al.), U.S. Pat. No. 5,233,272 (Whang et al.), U.S. Pat. No. 6,069,450 (Sakai et al.), U.S. Pat. No. 6,160,348 (Choi), and U.S. Pat. No. 6,428,377 (Choi), all incorporated herein by reference. In such embodiment, there is a DC gas discharge within each plasma-shell.

Single Substrate PDP

In one embodiment, there is used an AC or DC PDP structure having a single substrate containing the electrodes and dielectric. This structure is also known as a monolithic plasma display panel structure. Single-substrate or monolithic plasma display panel structures are disclosed by U.S. Pat. No. 3,646,384 (Lay), U.S. Pat. No. 3,652,891 (Janning), U.S. Pat. No. 3,666,981 (Lay), U.S. Pat. No. 3,811,061 (Nakayama et al.), U.S. Pat. No. 3,860,846 (Mayer), U.S. Pat. No. 3,885,195 (Amano), U.S. Pat. No. 3,935,494 (Dick et al.), U.S. Pat. No. 3,964,050 (Mayer), U.S. Pat. No. 4,106,009 (Dick), U.S. Pat. No. 4,164,678 (Biazzo et al.), and U.S. Pat. No. 4,638,218 (Shinoda), all incorporated herein by reference.

RELATED PRIOR ART

Spheres, Beads, Ampoules, Capsules

Gas filled hollow microspheres are referred to as spheres, beads, ampoules, capsules, bubbles, shells, and so forth. The following references relate to microspheres and are incorporated herein by reference. U.S. Pat. No. 2,644,113 (Etzkorn) discloses ampoules or hollow glass beads containing luminescent gases that emit a colored light. In one embodiment, the ampoules are used to radiate ultraviolet light onto a phosphor external to the ampoule itself. U.S. Pat. No. 3,848,248 (MacIntyre) discloses the embedding of gas filled beads in a transparent dielectric. The beads are filled with a gas using a capillary. The external shell of the beads may contain phosphor. U.S. Pat. No. 3,998,618 (Kreick et al.) discloses the manufacture of gas filled beads by the cutting of tubing. The tubing is cut into ampoules and heated to form shells. The gas is a rare gas mixture, 95% neon, and 5% argon, at a pressure of 300 Torr. U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture, which emits a color upon discharge, and/or by using a glass shell made from colored glass. U.S. Pat. No. 4,963,792 (Parker) discloses a gas discharge chamber including a transparent dome portion. U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen.

U.S. Pat. No. 6,545,422 (George et al.) discloses a light-emitting panel with a plurality of sockets with spherical or other shape micro-components in each socket sandwiched between two opposing substrates. The micro-component includes a shell filled with a plasma-forming gas or other material. The light-emitting panel may be a plasma display, electroluminescent display, or other display device. Other patents and published patent applications by George et al. and various joint inventors include U.S. Pat. No. 6,570,335 (George et al.), U.S. Pat. No. 6,612,889 (Green et al.), U.S. Pat. No. 6,620,012 (Johnson et al.), U.S. Pat. No. 6,646,388 (George et al.), U.S. Pat. No. 6,762,566 (George et al.), U.S. Pat. No. 6,764,367 (Green et al.), U.S. Pat. No. 6,791,264 (Green et al.), U.S. Pat. No. 6,796,867 (George et al.), U.S. Pat. No. 6,801,001 (Drobot et al.), U.S. Pat. No. 6,822,626 (George et al.), U.S. Pat. No. 6,902,456 (George et al.), U.S. Pat. No. 6,935,913 (Wyeth et al.), U.S. Pat. No. 6,975,068 (Green et al.), U.S. Pat. No. 7,005,793 (George et al.), U.S. Pat. No. 7,025,648 (Green et al.), U.S. Pat. No. 7,125,305 (Green et al.), U.S. Pat. No. 7,137,857 (George et al.), U.S. Pat. No. 7,140,941 (Green et al.), and U.S. Patent Application Publication Nos. 2004/0063373 (Johnson et al.), 2005/0095944 (George et al.), and 2006/0097620 (George et al.), all incorporated herein by reference.

Also incorporated herein by reference are U.S. Pat. No. 6,864,631 (Wedding), U.S. Pat. No. 7,247,989 (Wedding), and U.S. Pat. No. 7,456,571 (Wedding), which disclose a gas discharge device comprised of plasma-shells filled with ionizable gas.

Methods of Producing Microspheres

Any suitable method or process may be used to produce hollow gas filled plasma-shells. Numerous methods and processes to produce hollow shells or microspheres are known in the prior art. Microspheres have been formed from glass, ceramic, metal, plastic, and other inorganic and organic materials. Some methods used to produce hollow glass microspheres incorporate a so-called blowing gas into the lattice of a glass while in frit form. The frit is heated and glass bubbles are formed by the in-permeation of the blowing gas. Microspheres formed by this method have diameters ranging from about 5 µm to approximately 5,000 µm. Methods of manufacturing glass frit for forming hollow microspheres are disclosed by U.S. Pat. No. 4,017,290 (Budrick et al.) and U.S. Pat. No. 4,021,253 (Budrick et al.), incorporated herein by reference. Budrick et al. (290) discloses a process whereby occluded material gasifies to form the hollow microsphere. Hollow microspheres are disclosed in U.S. Pat. No. 5,500,287 (Henderson) and U.S. Pat. No. 5,501,871 (Henderson), incorporated herein by reference. In Henderson (287), the hollow microspheres are formed by dissolving a permeant gas (or gases) into glass frit particles. The gas permeated frit particles are then heated at a high temperature sufficient to blow the frit particles into hollow microspheres containing the permeant gases. The gases may be subsequently out-permeated and evacuated from the hollow shell.

U.S. Pat. No. 4,257,798 (Hendricks et al.), incorporated herein by reference, discloses a method for manufacturing small hollow glass spheres filled with a gas introduced during the formation of the spheres. The gases disclosed include argon, krypton, xenon, bromine, DT, hydrogen, deuterium, helium, hydrogen, neon, and carbon dioxide. Other Hendricks patents for the manufacture of glass spheres include U.S. Pat. Nos. 4,133,854 and 4,186,637, both incorporated herein by reference.

Microspheres are also produced as disclosed in U.S. Pat. No. 4,415,512 (Torobin), incorporated herein by reference. This method by Torobin comprises forming a film of molten glass across a blowing nozzle and applying a blowing gas at a positive pressure on the inner surface of the film to blow the film and form an elongated cylinder shaped liquid film of molten glass. An inert entraining fluid is directed over and around the blowing nozzle at an angle to the axis of the blowing nozzle so that the entraining fluid dynamically induces a pulsating or fluctuating pressure at the opposite side of the blowing nozzle in the wake of the blowing nozzle. The continued movement of the entraining fluid produces asymmetric fluid drag forces on a molten glass cylinder, which close and detach the elongated cylinder from the coaxial blowing nozzle.

Surface tension forces acting on the detached cylinder form the latter into a spherical shape, which is rapidly cooled and solidified by cooling means to form a glass microsphere. In one embodiment of the above method for producing the microspheres, the ambient pressure external to the blowing nozzle is maintained at a super atmospheric pressure. The ambient pressure external to the blowing nozzle is such that it substantially balances, but is slightly less than the blowing gas pressure. Such a method is disclosed by U.S. Pat. No. 4,303,432 (Torobin) and WO 8000438A1 (Torobin), both incorporated herein by reference. The microspheres may also be produced using a centrifuge apparatus and method as disclosed by U.S. Pat. No. 4,303,433 (Torobin) and WO8000695A1 (Torobin), both incorporated herein by reference. Other methods for forming microspheres of glass, ceramic, metal, plastic, and other materials are disclosed in other Torobin patents including U.S. Pat. Nos. 5,397,759; 5,225,123; 5,212,143; 4,793,980; 4,777,154; 4,743,545; 4,671,909; 4,637,990; 4,582,534; 4,568,389; 4,548,196; 4,525,314; 4,363,646; 4,303,736; 4,303,732; 4,303,731; 4,303,603; 4,303,431; 4,303,730; 4,303,729; and 4,303,061, all incorporated herein by reference. U.S. Pat. No. 3,607,169 (Coxe) and U.S. Pat. No. 4,303,732 (Torobin) disclose an extrusion method in which a gas is blown into molten glass and individual shells are formed. As the shells leave the chamber, they cool and some of the gas is trapped inside. U.S. Pat. No. 4,349,456 (Sowman), incorporated herein by reference, discloses a process for making ceramic metal oxide microspheres by blowing a slurry of ceramic and highly volatile organic fluid through a coaxial nozzle. As the liquid dehydrates, gelled microcapsules are formed. These microcapsules are recovered by filtration, dried, and fired to convert them into microspheres. Prior to firing, the microcapsules are sufficiently porous that, if placed in a vacuum during the firing process, the gases can be removed and the resulting microspheres will generally be impermeable to ambient gases. The shells formed with this method may be filled with a variety of gases and pressurized from near vacuums to above atmosphere. This is a suitable method for producing microspheres. However, shell uniformity may be difficult to control.

Also incorporated herein by reference is Applicant's copending U.S. patent application Ser. No. 11/482,948, filed Jul. 10, 2006, issued as U.S. Pat. No. 7,730,746 to Thomas J. Pavliscak and Carol Ann Wedding.

U.S. Patent Application Publication 2002/0004111 (Matsubara et al.), incorporated herein by reference, discloses a method of preparing hollow glass microspheres by adding a combustible liquid (kerosene) to a material containing a foaming agent. Methods for forming microspheres are also disclosed in U.S. Pat. No. 3,848,248 (MacIntyre), U.S. Pat. No. 3,998,618 (Kreick et al.), and U.S. Pat. No. 4,035,690 (Roeber), discussed above and incorporated herein by reference. Methods of manufacturing hollow microspheres are disclosed in U.S. Pat. No. 3,794,503 (Netting), U.S. Pat. No. 3,796,777 (Netting), U.S. Pat. No. 3,888,957 (Netting), and U.S. Pat. No. 4,340,642 (Netting et al.), all incorporated herein by reference. Other prior art methods for forming microspheres are disclosed in the prior art including U.S. Pat. No. 3,528,809 (Farnand et al.), U.S. Pat. No. 3,975,194 (Farnand et al.), U.S. Pat. No. 4,025,689 (Kobayashi et al.), U.S. Pat. No. 4,211,738 (Genis), U.S. Pat. No. 4,307,051 (Sargeant et al.), U.S. Pat. No. 4,569,821 (Duperray et al.), U.S. Pat. No. 4,775,598 (Jaeckel), and U.S. Pat. No. 4,917,857 (Jaeckel et al.), all of which are incorporated herein by reference.

RELATED PRIOR ART

PDP Tubes

The following prior art references relate to the use of elongated tubes in a PDP and are incorporated herein by reference. U.S. Pat. No. 3,602,754 (Pfaender et al.) discloses a multiple discharge gas display panel in which filamentary or capillary size glass tubes are assembled to form a gas discharge panel. U.S. Pat. No. 3,654,680 (Bode et al.), U.S. Pat. No. 3,927,342 (Bode et al.) and U.S. Pat. No. 4,038,577 (Bode et al.) disclose a gas discharge display in which filamentary or capillary size gas tubes are assembled to form a gas discharge panel. U.S. Pat. No. 3,969,718 (Strom) discloses a plasma display system utilizing tubes arranged in a side-by-side parallel fashion. U.S. Pat. No. 3,990,068 (Mayer et al.) discloses a capillary tube plasma display with a plurality of capillary tubes arranged parallel in a close pattern. U.S. Pat. No. 4,027,188 (Bergman) discloses a tubular plasma display consisting of parallel glass capillary tubes sealed in a plenum and attached to a rigid substrate. U.S. Pat. No. 5,984,747 (Bhagavatula et al.) discloses rib structures for containing plasma in electronic displays that are formed by drawing glass preforms into fiber-like rib components. The rib components are then assembled to form rib/channel structures suitable for flat panel displays. U.S. Patent Application Publication 2001/0028216A1 (Tokai et al.) discloses a group of elongated illuminators in a gas discharge device. U.S. Pat. No. 6,255,777 (Kim et al.) and U.S. Patent Application Publication 2002/0017863 (Kim et al.), disclose a capillary electrode discharge PDP device and a method of fabrication. PDP structures with elongated display tubes are disclosed in U.S. Pat. No. 6,914,382 (Ishimoto et al.), U.S. Pat. No. 6,893,677 (Yamada et al.), U.S. Pat. No. 6,857,923 (Yamada et al.), U.S. Pat. No. 6,841,929 (Ishimoto et al.), U.S. Pat. No. 6,836,064 (Yamada et al.), U.S. Pat. No. 6,836,063 (Ishimoto et al.), U.S. Pat. No. 6,794,812 (Yamada et al.), U.S. Pat. No. 6,677,704 (Ishimoto et al.), U.S. Pat. No. 6,650,055 (Ishimoto et al.), and U.S. Pat. No. 6,633,117 (Shinoda et al.), all incorporated herein by reference.

PDP structures with elongated display tubes are disclosed by U.S. Patent Application Publication Nos. 2005/0115495 (Yamada et al.), 2004/0152389 (Tokai et al.), 2004/0033319 (Yamada et al.), 2003/0214224 (Awamoto et al.), 2003/0182967 (Tokai et al.), 2003/0122485 (Tokai et al.) and 2003/0025451 (Yamada et al.), all incorporated herein by reference.

As used herein elongated tube is intended to include capillary, filament, filamentary, illuminator, hollow rods, or other such terms. It includes an elongated enclosed gas filled structure having a length dimension which is greater than its cross-sectional width dimension. The width of the tube is typically the viewing direction of the display. Also as used herein, an elongated plasma-tube has multiple gas discharge pixels of 100 or more, typically 500 to 1000 or more, whereas a plasma-shell typically has only one gas discharge pixel. In some special embodiments, the plasma-shell may have more than one pixel, i.e., 2, 3, or 4 pixels up to 10 pixels. The U.S. patents issued to George et al. and listed above as related microsphere prior art also disclose elongated tubes and are incorporated herein by reference.

RELATED PRIOR ART

PDP Radiation Detector

The use of an open cell plasma display device with two or more substrates as a radiation detector is disclosed in U.S. Pat. Nos. 7,518,119, and 7,332,726, U.S. Patent Application Publication Nos. 2008/0210878, 2006/0049362, and WO 2007/044068, and WO 2007/001582, all incorporated herein by reference.

The George et al. U.S. patents and U.S. published patent applications, listed above, disclose PDP radiation sensors. U.S. Pat. No. 6,545,422 to George et al. discloses a two substrate light-emitting panel with a plurality of gas filled spherical micro-components sandwiched between two substrates. The light-emitting panel may be used for particle/photon detection. In one embodiment, the panel is subjected to a potential that is slightly below the write voltage required for gas ionization. When the device is subjected to outside energy at a specific position or location in the panel, the additional energy causes the gas to ionize thereby providing a means of detecting outside energy.

SUMMARY OF INVENTION

In accordance with this invention, there is provided radiation detection or sensing apparatus and method comprising an AC or DC gas discharge device constructed out of one or more plasma-shells on or within two or more tiled substrates, each plasma-shell serving as a radiation detector or sensor shell. The substrates may be rigid, flexible, or semi-flexible. Each plasma-shell is electrically connected to at least one electrical conductor such as an electrode. In some embodiments, two or more conductors are connected to each plasma-shell. In such embodiments, insulating barriers may be used to prevent contact between electrodes. The plasma-shell may be of any suitable geometric shape such as a plasma-sphere, plasma-disc, or plasma-dome. Combinations of plasma-shells of different geometric shapes may be used. This invention is described herein with plasma-discs alone or in combination with other plasma-shells, but other geometric shapes and combinations are contemplated.

The plasma-shell is typically composed of an inorganic material and is filled with an ionizable gas at a desired mixture and pressure. In some embodiments, the plasma-shell may contain organic materials. The gas is selected to produce visible, UV, and/or infrared photons during gas discharge when a voltage is applied. The plasma-shell material may be made of radiation detection or sensing materials such as secondary electron emission and/or luminescent substances, including organic and/or inorganic luminescent substances. The detector materials may be added to the inside or outer surface of the plasma-shell or added directly to the plasma-shell material.

A plasma-sphere is a hollow sphere with relatively uniform shell thickness. The shell is typically composed of a dielectric material. It is filled with an ionizable gas at a desired mixture and pressure. The gas produces visible, UV, and/or infrared discharge when a voltage is applied. The shell material is selected to optimize dielectric properties and optical transmissivity. Additional beneficial materials may be added to the inside or outer surface of the sphere including magnesium oxide for secondary electron emission. The magnesium oxide and other materials including organic and/or inorganic luminescent substances may be added directly to the shell material.

A plasma-disc is similar to the plasma-sphere in material composition and ionizable gas selection. It differs from the plasma-sphere in that it is flattened on both the top and bottom. A plasma-sphere or sphere may be flattened to form a plasma-disc by applying heat and pressure simultaneously to the top and bottom of the sphere using two substantially flat and ridged members, either of which may be heated. The plasma-disc may have sides or edges, which are round, curved, flat, or angled. The top and bottom are substantially flat and may have one or more flattened sides. The top and bottom can be substantially the same area or be different areas. The top and bottom can be substantially parallel to one another or not parallel to one another.

A plasma-dome is similar to a plasma-sphere in material composition and ionizable gas selection. It differs in that one side is domed. A plasma-sphere is flattened on one or more other sides to form a plasma-dome, typically by applying heat and pressure simultaneously to the top and bottom of the plasma-sphere or sphere using one substantially flat and ridged member and one substantially elastic member. In one embodiment, the substantially rigid member is heated. A plasma-dome may also be made by cutting an elongated tube as shown in U.S. Pat. No. 3,998,618 (Kreick et al.) incorporated herein by reference.

A plasma-cube is a hollow cube with six flat sides. It is a regular shape with six congruent square faces, the angle between any two adjacent faces being a right angle. It can be formed on a mold under pressure with or without heat.

A plasma-cuboid is a hollow cube with six flat sides of different dimensions. The cross-section along any axis is a rectangle, trapezoid, parallelogram, or other flat, four sided shape. It is also known as a rectangular parallelepiped. It can be made in the same way as a cube.

In accordance with this invention, there is provided a radiation detector or sensor using a gas discharge device with a multiplicity of plasma-shells, each plasma-shell containing gas and affixed to a single substrate. At least one electrode is in contact with each gas encapsulating plasma-shell, the electrodes being affixed to or embedded within the substrate, and connected to electronic circuitry including electronics for addressing and sustaining each plasma-shell. The plasma-shells are mounted on a single substrate that is rigid, flexible, or semi-flexible. Each plasma-shell encapsulates the gas independently of the substrate. In some embodiments, plasma-shells may be located on both sides of the substrate.

In order to sensitize or tune a plasma-shell or multiple plasma-shells to specific kind(s), type(s), and/or level(s) of radiation, a plasma-shell, or group of plasma-shells may have varying parameters. Different plasma-shells or groups of plasma-shells can have different ionizable gases, different gas pressures, different dimensions, different geometric shapes, different shell compositions, and/or different voltages so that different plasma-shells or groups of plasma-shells can detect different kinds or types of radiation, or different levels of radiation.

When a multiplicity of gas filled plasma-shells are positioned or located on a relatively large surface such as a substrate, one or more plasma-shells located on one part of the substrate may selectively detect radiation or sense independently of radiation detection by plasma-shells located on another part of the substrate remote from the location of the other detecting plasma-shells. The plasma-shells may be located on both sides of a substrate so as to detect or sense radiation in two opposite directions.

In one embodiment, at least one plasma-shell contains at least one selected ionizable gas and at least one other plasma-shell contains another ionizable gas, each gas being selected to detect radiation of a given energy level and/or kind of radiation. In this embodiment, one or more plasma-shells contain a selected ionizable gas selected to detect a given level, type, and/or kind of radiation whereas one or more other plasma-shells contain a different ionizable gas selected to detect a different level, type and/or kind of radiation.

Groups of plasma-shells filled with different gases may be located together on the surface of the substrate such that groups of plasma-shells at one location can detect different levels, types, and/or kinds of radiation independent of groups of radiation detecting plasma-shells at other locations.

Different plasma-shells within the radiation detector may be made of selected materials such that one plasma-shell or group of plasma-shells detect different level(s), type(s), and/or kind(s) of radiation independent of radiation detected by a plasma-shell or group of plasma-shells made of other selected materials.

The voltage or current applied to a plasma-shell or group of plasma-shells may also be varied independent of the voltage or current applied to another plasma-shell or group of plasma-shells to selectively detect different level(s), type(s), and/or kind(s) of radiation.

The gas pressure in a plasma-shell or group of plasma-shells may also be varied independent of the gas pressure in another plasma-shell or group of plasma-shells to selectively detect different level(s), type(s), and/or kind(s) of radiation.

The thickness of a plasma-shell or group of plasma-shells may also be varied relative to another plasma-shell or group of plasma-shells to selectively detect different level(s), type(s), and/or kind(s) of radiation.

In some embodiments, two or more opposing substrates are used. In one embodiment, the plasma-shells are located on a single substrate such that the radiation can be directly detected by the plasma-shells without the interference or partial blocking of the radiation by a second substrate positioned between the plasma-shells and the source of the radiation. The plasma-shells may be located on both sides of the single substrate so as to detect radiation from two different directions. The plasma-shells may be located in substrate cavities or holes that extend through the substrate so that a given plasma-shell can detect radiation on both sides of the substrate.

The tiled substrates containing hollow, gas filled plasma-shells are used for radiation detection. The gas filled plasma-shells are placed on or within the surface of the substrate which may be a printed circuit board. Multiple substrates containing plasma-shells are tiled together to form a larger substrate including a geometric or volumetric structure such as a dome or hemisphere. One or more plasma-shells are located on a substrate, each plasma-shell being connected to one or more electrical conductors such as electrodes. The plasma-shells may be located on the surface of the substrate or within the substrate. Insulating barriers may be provided to prevent contact between the connecting electrodes. The locating of the plasma-shells on the substrate includes positioning, attaching, mounting, or like contact with the substrate.

Read-out or other means can be provided for each plasma-shell independent of other plasma-shells or for one group of plasma-shells independent of other groups to indicate that radiation has been detected. The read-out can be any suitable mechanism, including electrical or optical. Visual feed-back is feasible by observing a visual gas discharge in one or more plasma-shells caused by the external radiation to be detected. The gas discharge photons can be visible or a luminescent material can provide visual output when the luminescent material is excited by photons from the gas discharge. Because an observer may not always be present when radiation detection and gas discharge occurs, recording means may be used. In one embodiment, the observer is at a remote station with a video camera and recording means focused at the detection device. With this embodiment, multiple radiation detection devices can be observed by one remote station.

A plasma-shell may be a hollow microsphere or sphere with relatively uniform shell thickness. A plasma-shell is disclosed in U.S. Pat. No. 6,864,631 (Wedding), U.S. Pat. No. 7,247,989 (Wedding), and U.S. Pat. No. 7,456,571 (Wedding), all incorporated herein by reference. The shell is composed of a dielectric or conductive material and is filled with an ionizable gas at a desired mixture and pressure. In a display application, the gas is selected to produce visible, ultraviolet (UV), and/or infrared (IR) photons during gas discharge when a voltage is applied. The shell material is selected to optimize dielectric properties and optical transmissivity. Beneficial materials may be added to the inner or outer surface of the plasma-shell including luminescent and secondary electron emission materials. Luminescent substances and secondary electron emission materials may be added to the shell. The luminescent substances may be any suitable inorganic and/or organic substances that emit photons when excited by photons from a gas discharge caused by external radiation. Mixtures of inorganic and organic luminescent materials may be used. The organic and/or inorganic luminescent substances, secondary electron emission materials, and/or other materials may be added directly to the shell material or composition during or after shell formation.

BRIEF DESCRIPTION OF THE DRAWINGS

FIG. 1C is a section view of a hexagonal tiled gas discharge radiation detection device.

FIG. 1D is a top view of a single hexagonal tile.

FIG. 1E is a side view of a single hexagonal tile.

FIG. 2C is a section view of a triangular tiled gas discharge radiation detection device.

FIG. 2D is a top view of a single triangular tile.

FIG. 2E is a side view of a single triangular tile.

DETAILED DESCRIPTION OF THE DRAWINGS

Figure 1A:
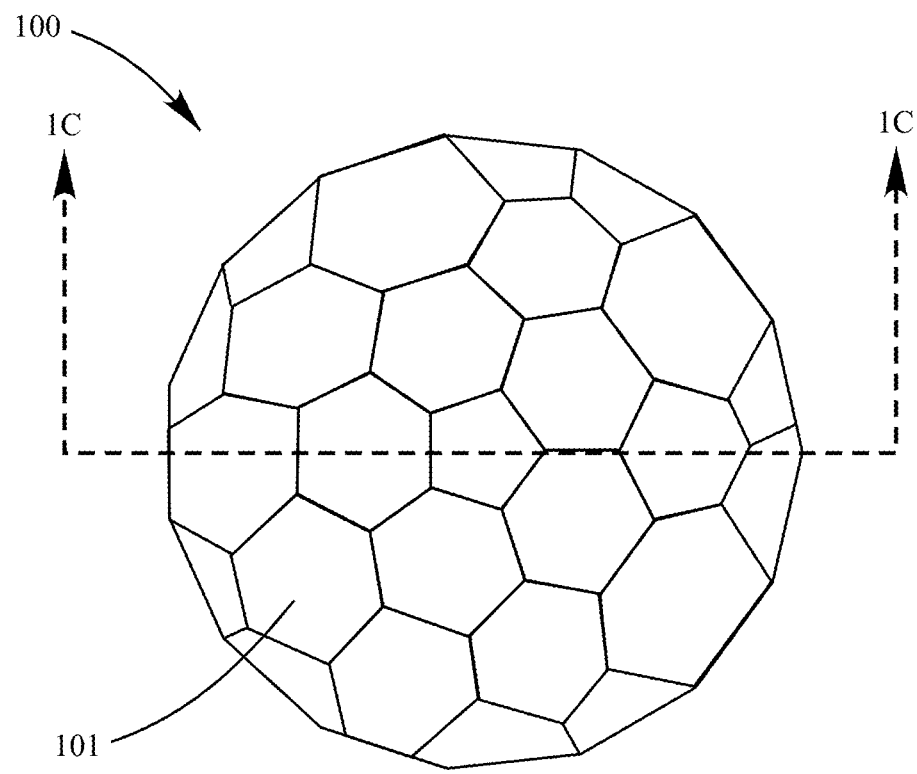
FIG. 1A is a top view of a hexagonal tiled gas discharge radiation detection device.

FIG. 1A shows a top view of a domed gas discharge structure 100 with hexagonal tiles 101 forming the structure. Each hexagonal tile 101 comprises an array of pixel elements not shown in FIG. 1A for detecting or sensing radiation. The array of pixel elements can be of any technology including plasma, LED, LCD, OLED, or electrophoretic. Other technologies are possible. Each pixel element can emit UV, visible, and/or infrared light, alone or in combination. Each pixel on each tile 101 is electronically controlled alone or in combination with other pixels on the same tile or on other tiles.

Figure 1B:
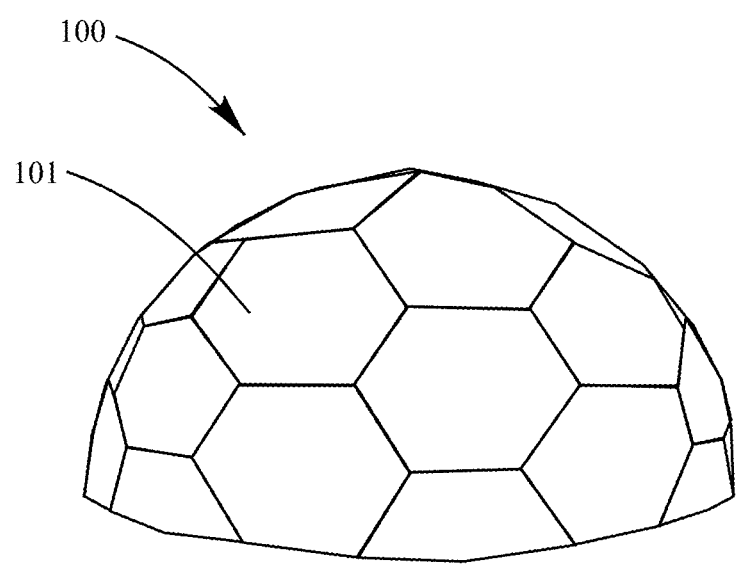
FIG. 1B is a side view of a hexagonal tiled gas discharge radiation detection device.

FIG. 1B shows a left or right side view of a domed gas discharge radiation detector structure 100 with hexagonal tiles 101 forming the detector structure. Each hexagonal tile 101 comprises an array of pixel elements not shown in FIG. 1B. The array of pixel elements can be of any technology including plasma, LED, LCD, OLED, or electrophoretic. Other technologies are possible. Each pixel element can emit UV, visible, and/or infrared light, alone or in combination. Each pixel on each tile 101 is electronically controlled alone or in combination with other pixels on the same tile or on other tiles.

FIG. 1C shows a section view of a hexagonal tiled structure 100, comprised of a plurality of hexagonal tiles 101.

FIG. 1D shows a top view of a single hexagonal tile 101 with detector plasma-shells 102 mounted to the substrate 103.

FIG. 1E shows a side view of a single hexagonal tile 101 with the plasma-shells 102 mounted to the substrate 103. The substrate 103 may be rigid, flexible, or semi-flexible.

Figure 2A:
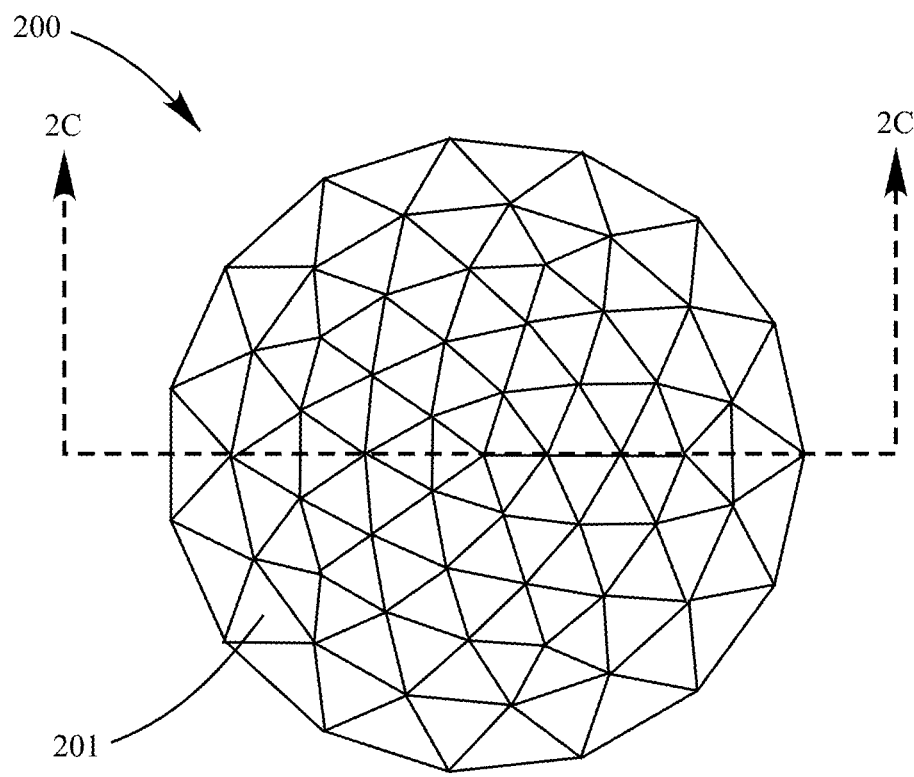
FIG. 2A is a top view of a triangular tiled gas discharge radiation detection device.

FIG. 2A shows a top view of a domed gas discharge radiation detector structure 200 with hexagonal tiles 201 forming the structure. Each hexagonal tile 201 comprises an array of pixel elements not shown in FIG. 2A. The array of pixel elements can be of any technology including plasma, LED, LCD, OLED, or electrophoretic. Other technologies are possible. Each pixel element can emit UV, visible, and/or infrared light, alone or in combination. Each pixel on each tile 201 is electronically controlled alone or in combination with other pixels on the same tile or on other tiles.

Figure 2B:
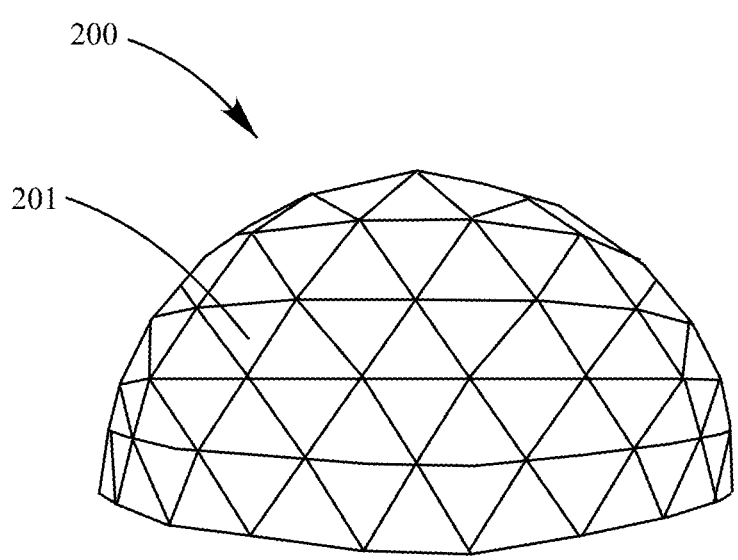
FIG. 2B is a side view of a triangular gas discharge radiation detection device.

FIG. 2B shows a left or right side view of a domed gas discharge radiation detector structure 200 with hexagonal tiles 201 forming the structure. Each hexagonal tile 201 comprises an array of pixel elements not shown in FIG. 2B. The array of pixel elements can be of any technology including plasma, LED, LCD, OLED, or electrophoretic. Other technologies are possible. Each pixel element can emit UV, visible, and/or infrared light, alone or in combination. Each pixel on each tile 201 is electronically controlled alone or in combination with other pixels on the same tile or on other tiles.

FIG. 2C shows a section view of a triangular tiled gas discharge radiation detector structure 200, comprised of a plurality of hexagonal tiles 201.

FIG. 2D shows a top view of a single triangular tile 201 with detector plasma-shells 202 mounted to the substrate 203. The substrate 203 may be rigid, flexible, or semi-flexible.

FIG. 2E shows a side view of a single triangular tile 201 with the plasma-shells 202 mounted to the substrate 203.

Triangular and hexagonal tiles used alone or in combination are especially useful in fabricating a domed structure. Such allow easy fabrication of domed net shapes using the same repeating pattern of the tile. Square, rectangular, and other geometric tile shapes are contemplated. Other tiled structures are contemplated including cylinders, tunnels, and other volumetric shapes. Large flat tiled substrates are also contemplated using hexagonal, triangular, or other shaped tiles.

Figure 3:
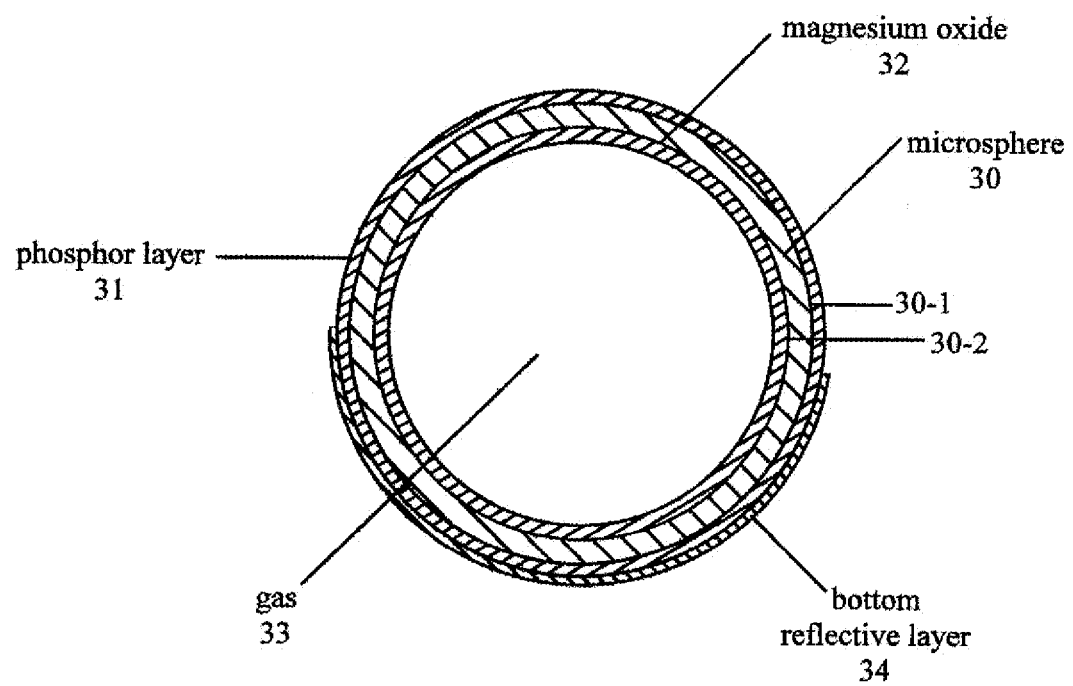
FIG. 3 shows a cross-sectional view of a plasma-sphere embodiment.

FIG. 3 shows a cross-sectional view of a detector plasma-shell in the shape of a plasma-sphere 30 with external surface 30-1 and internal surface 30-2, an external phosphor layer 31, internal magnesium oxide layer 32, ionizable gas 33, and an external bottom reflective layer 34. The bottom reflective layer 34 is optional and, when used, will typically cover about half of the phosphor layer 31 on the external surface 30A. This bottom reflective layer 34 will reflect light for display purposes. One or more electrodes may be used for reflection.

Magnesium oxide increases the ionization level through secondary electron emission that in turn leads to reduced gas discharge voltages. The magnesium oxide layer 32 on the inner surface 30-1 of the plasma-spheres 30 is separate from the phosphor which is located on external surface 30-2 of the plasma-spheres 30. The thickness of the magnesium oxide is about 250 Angstrom Units (Å) to 10,000 Angstrom Units (Å). Magnesium oxide may be incorporated into the shell. The shell may be also made substantially of magnesium oxide.

The magnesium oxide layer 32 may be applied to the inside of the plasma-shells 30-1 by using a process similar to the technique disclosed by U.S. Pat. No. 4,303,732 (Torobin). In this process, magnesium vapor is incorporated as part of the ionizable gases introduced into the plasma-shells while the plasma-shells are at an elevated temperature.

In some embodiments the magnesium oxide may be present as particles in the gas. Other secondary electron materials may be used in place of or in combination with magnesium oxide. In one embodiment hereof, the secondary electron material is introduced into the gas by means of a fluidized bed.

Figure 4:
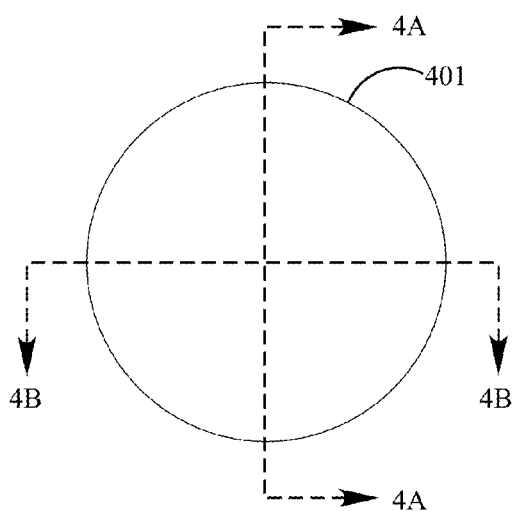
FIGS. 4, 4A, and 4B show a plasma-dome with one flat side.
Figure 4A:
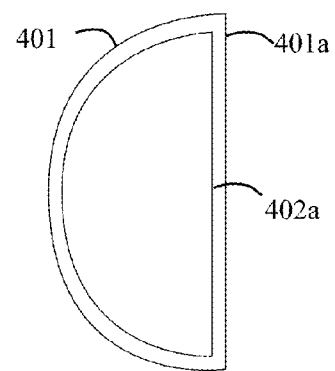
Figure 4B:
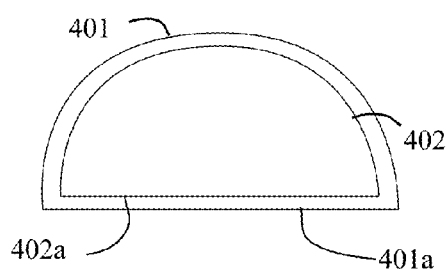

A detector plasma-shell in the shape of a plasma-dome is shown in FIGS. 4, 4A, and 4B. FIG. 4 is a top view of a plasma-dome showing an outer plasma-shell wall 401. FIG. 4A is a section 4A-4A view of FIG. 4 showing a flattened outer wall 401a and flattened inner wall 402a. FIG. 4B is a section 4B-4B view of FIG. 4.

Figure 5:
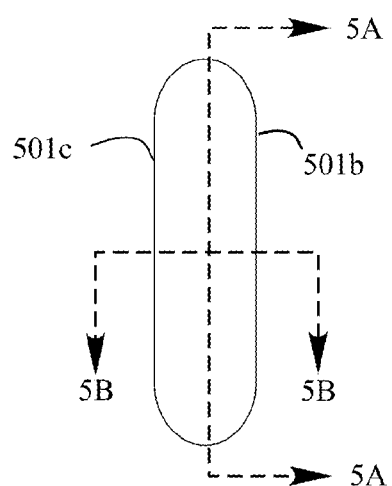
FIGS. 5, 5A, and 5B show a plasma-dome with multiple flat sides.
Figure 5A:
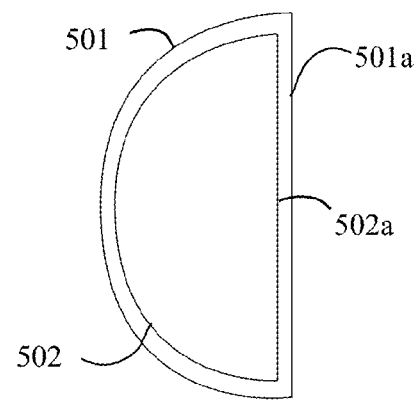
Figure 5B:
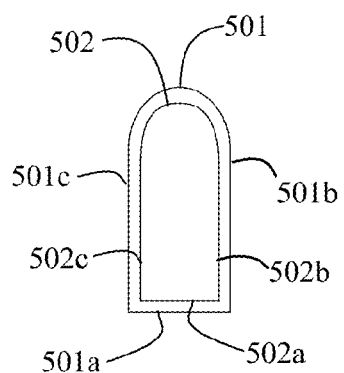

FIG. 5 is a top view of a detector plasma-dome with flattened outer plasma-shell wall 501b and 501c. FIG. 5A is a section 5A-5A view of FIG. 5 showing flattened outer wall 501a and flattened inner wall 502a with a plasma-dome having outer wall 501 and inner wall 502. FIG. 5B is a section 5B-5B view of FIG. 5. The plasma-dome portion may be positioned within the substrate with the flat side up in the detecting direction or with the plasma-dome portion up in the detecting direction.

Figure 6A:
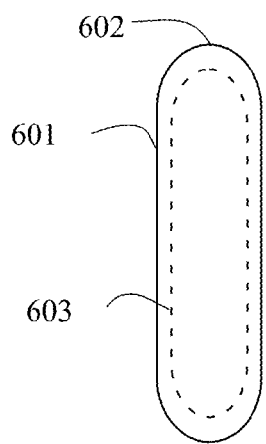
FIGS. 6A and 6B show a plasma-disc.
Figure 6B:
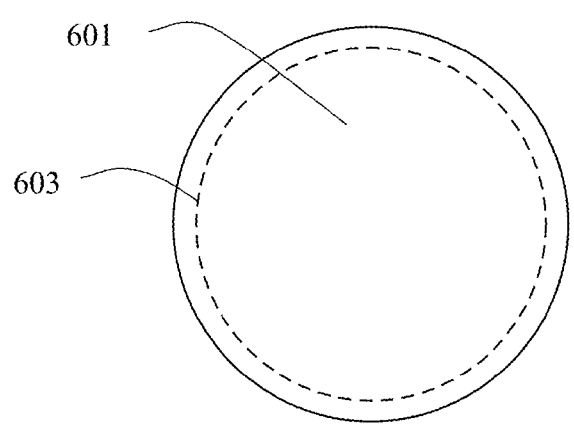

FIGS. 6A and 6B show a detector plasma-shell in the shape of a plasma-disc. As illustrated in FIGS. 6A and 6B, the plasma-disc has opposing flat circular sides 601. FIG. 6A is a left or right end view of FIG. 6B. FIG. 6B is a view of either flat circular side 601 of FIG. 6A. As shown in FIG. 6A, the ends 602 are rounded and do not have corners. The inside wall surface 603 of the hollow plasma-disc is shown as a broken line in both FIGS. 6A and 6B.

Figure 7:
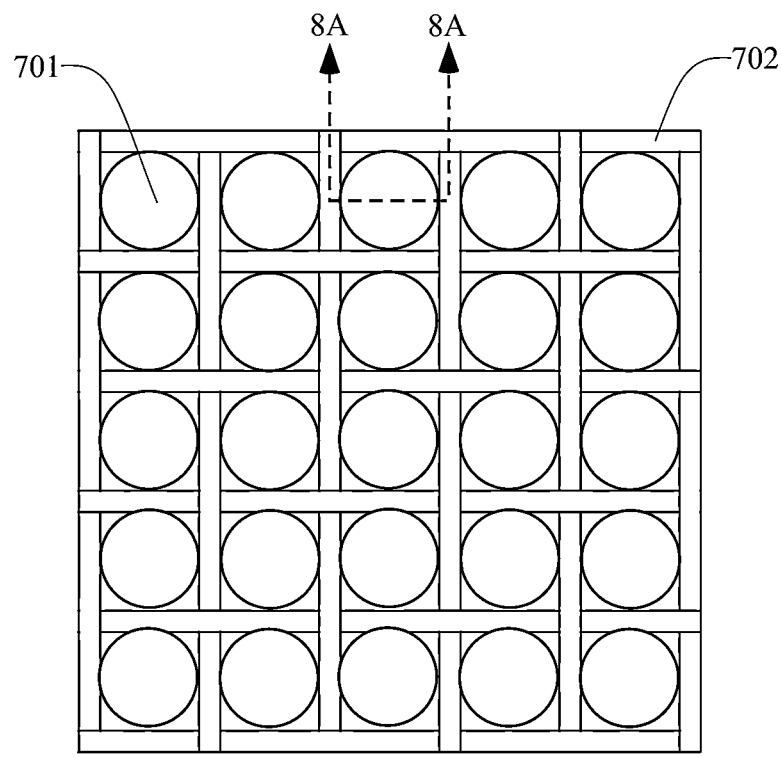
FIG. 7 is a top view of detector plasma-shells embedded in a substrate.

FIG. 7 shows a top view of gas filled detector plasma-shells 701 embedded in a substrate 702. The substrate may be flexible, semi-flexible, or rigid. Examples of flexible substrates include fabric or fiber materials such as cotton, nylon, polyester, spandex, satin, silk, wool, denim, fleece, other textiles, and the like. Impact resistant fibers such as Kevlar, Spectra, Aramid fibers, Dyneema, and the like are also contemplated.

Figure 8A:
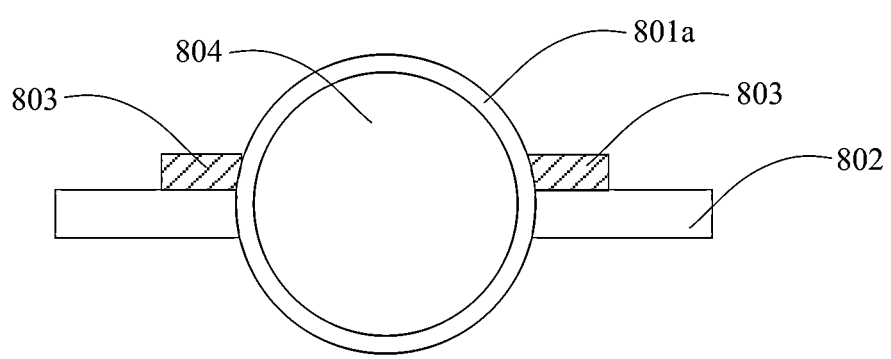
FIG. 8A is a section 8A-8A view of a detector plasma-sphere embedded in a substrate shown in FIG. 7.

FIG. 8A shows a section 8A-8A view of a gas filled detector plasma-sphere 801a embedded within a substrate 802. Gas 804 is contained within the sphere 801a. Optional electrodes or antenna 803 are attached or bonded to the sphere 801a and substrate 802.

Figure 8B:
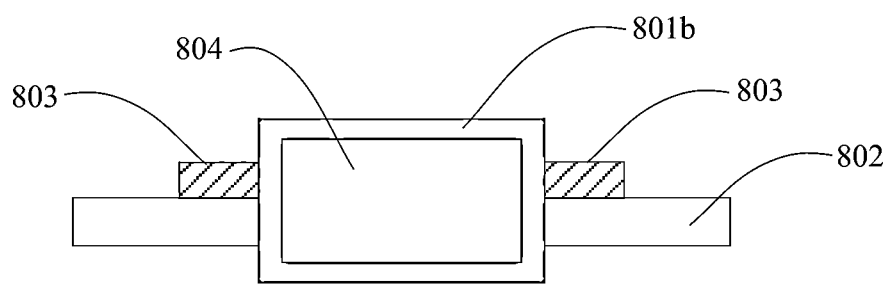
FIG. 8B is an alternate section 8A-8A view of a detector plasma-disc embedded in a substrate.

FIG. 8B shows an alternate section 8A-8A view of a gas filled detector plasma-disc 801b embedded within a substrate 802. Gas 804 is contained within the disc 801b. Optional electrodes or antenna 803 are attached or bonded to the disc 801b and substrate 802.

Figure 8C:
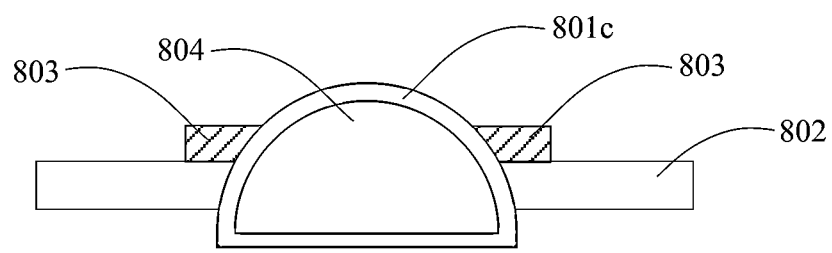
FIG. 8C is an alternate section 8A-8A view of a detector plasma-dome embedded in a substrate.

FIG. 8C shows an alternate section 8A-8A view of a gas filled detector plasma-dome 801c embedded within a substrate 802. Gas 804 is contained within the dome 801c. Optional electrodes or antenna 803 are attached or bonded to the dome 801c and substrate 802.

Figure 9A:
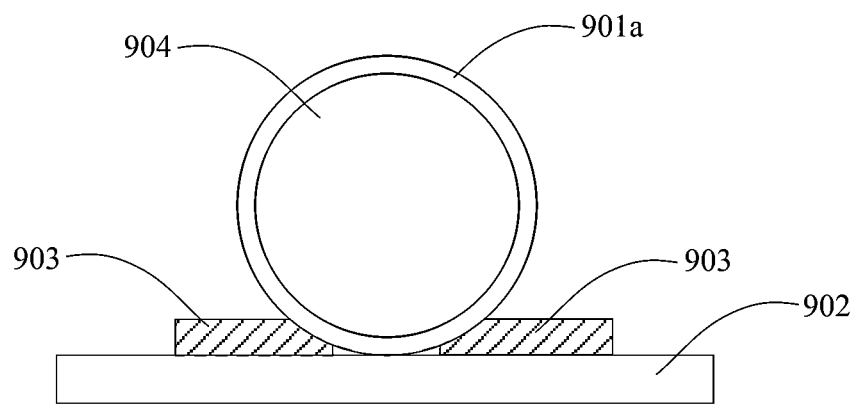
FIG. 9A is an alternate section 8A-8A view of a detector plasma-sphere on the surface of a substrate.

FIG. 9A shows an alternate section 8A-8A view of a gas filled detector plasma-sphere 901a located on the surface of a substrate 902. Gas 904 is contained within the sphere 901a. Optional electrodes or antenna 903 are attached or bonded to the sphere 901a and substrate 902.

Figure 9B:
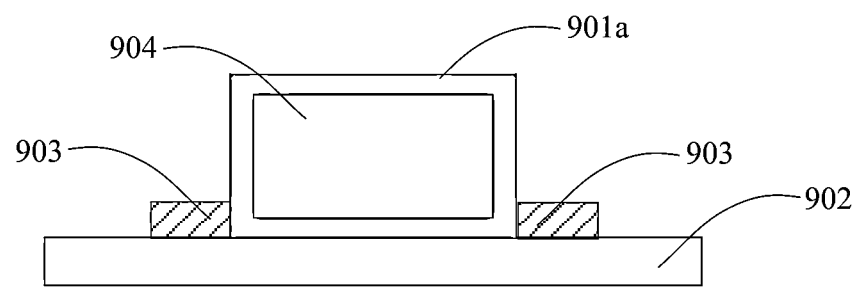
FIG. 9B is an alternate section 8A-8A view of a detector plasma-disc on the surface of in a substrate.

FIG. 9B shows an alternate section 8A-8A view of a gas filled detector plasma-disc 901b located on the surface of a substrate 902. Gas 904 is contained within the disc 901b. Optional electrodes or antenna 903 are attached or bonded to the disc 901b and substrate 902.

Figure 9C:
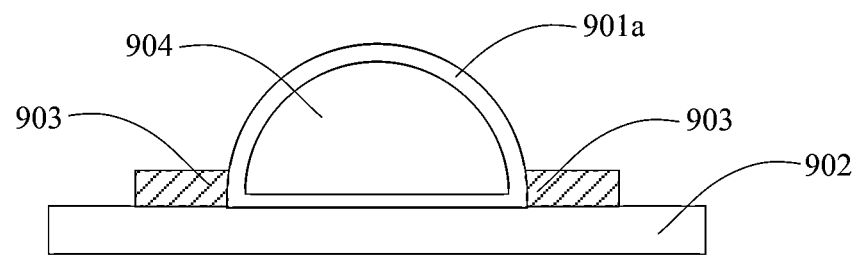
FIG. 9C is an alternate section 8A-8A view of a detector plasma-dome on the surface of in a substrate.

FIG. 9C shows an alternate section 8A-8A view of a gas filled detector plasma-dome 901c located on the surface of a substrate 902. Gas 904 is contained within the dome 901c. Optional electrodes or antenna 903 are attached or bonded to the dome 901c and substrate 902.

Figure 10:
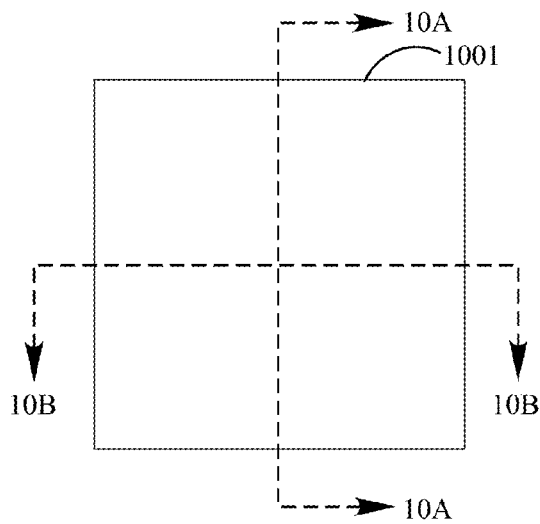
FIGS. 10, 10A, and 10B show a plasma-cube.
Figure 10A:
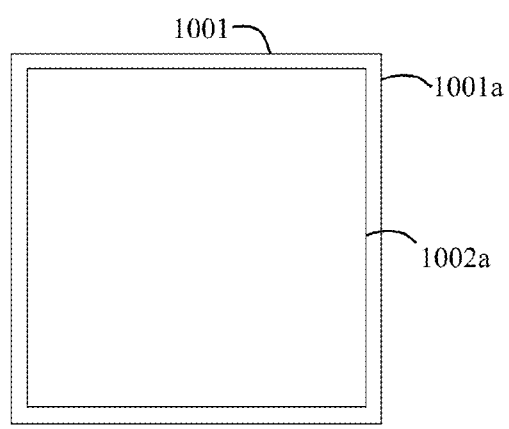
Figure 10B:
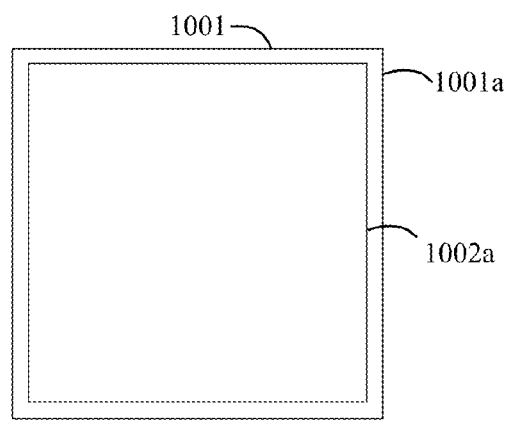

FIGS. 10, 10A, and 10B show a plasma-shell in the shape of a plasma-cube. As illustrated in FIG. 10, the plasma-cube has opposing flat, parallel sides 1001.

FIG. 10A is a section 10A-10A view of FIG. 10 with flat, parallel sides 1001, inside wall surface 1002a, and outer wall surface 1001a.

FIG. 10B is a section 10B-10B view of FIG. 10 with flat, parallel sides 1001, inside wall surface 1002a, and outer wall surface 1001a.

Figure 11:
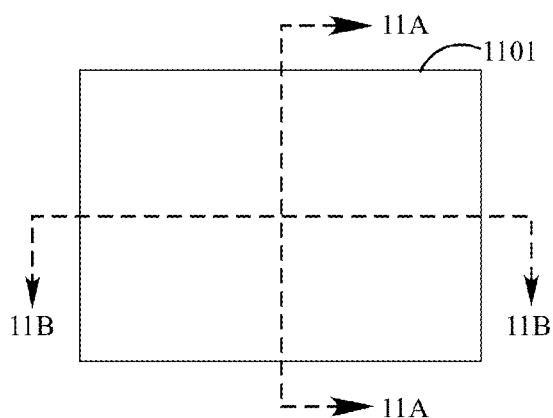
FIGS. 11, 11A, and 11B show a plasma-cuboid.
Figure 11A:
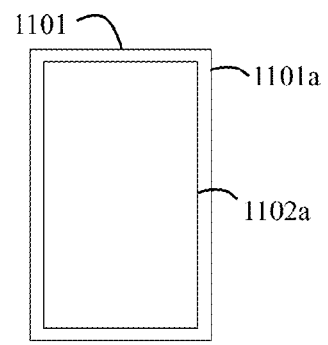
Figure 11B:
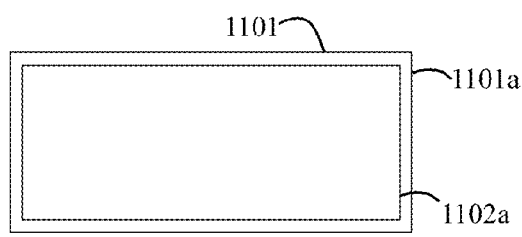

FIGS. 11, 11A, and 11B show a plasma-shell in the shape of a plasma-cuboid. As illustrated in FIG. 11, the plasma-cuboid has opposing flat, parallel sides 1101.

FIG. 11A is a section 11A-11A view of FIG. 11 with flat, parallel sides 1101, inside wall surface 1102a, and outer wall surface 1101a.

FIG. 11 is a section 11B-11B view of FIG. 11 with flat, parallel sides 1101, inside wall surface 1102a, and outer wall surface 1101a.

Figure 12:
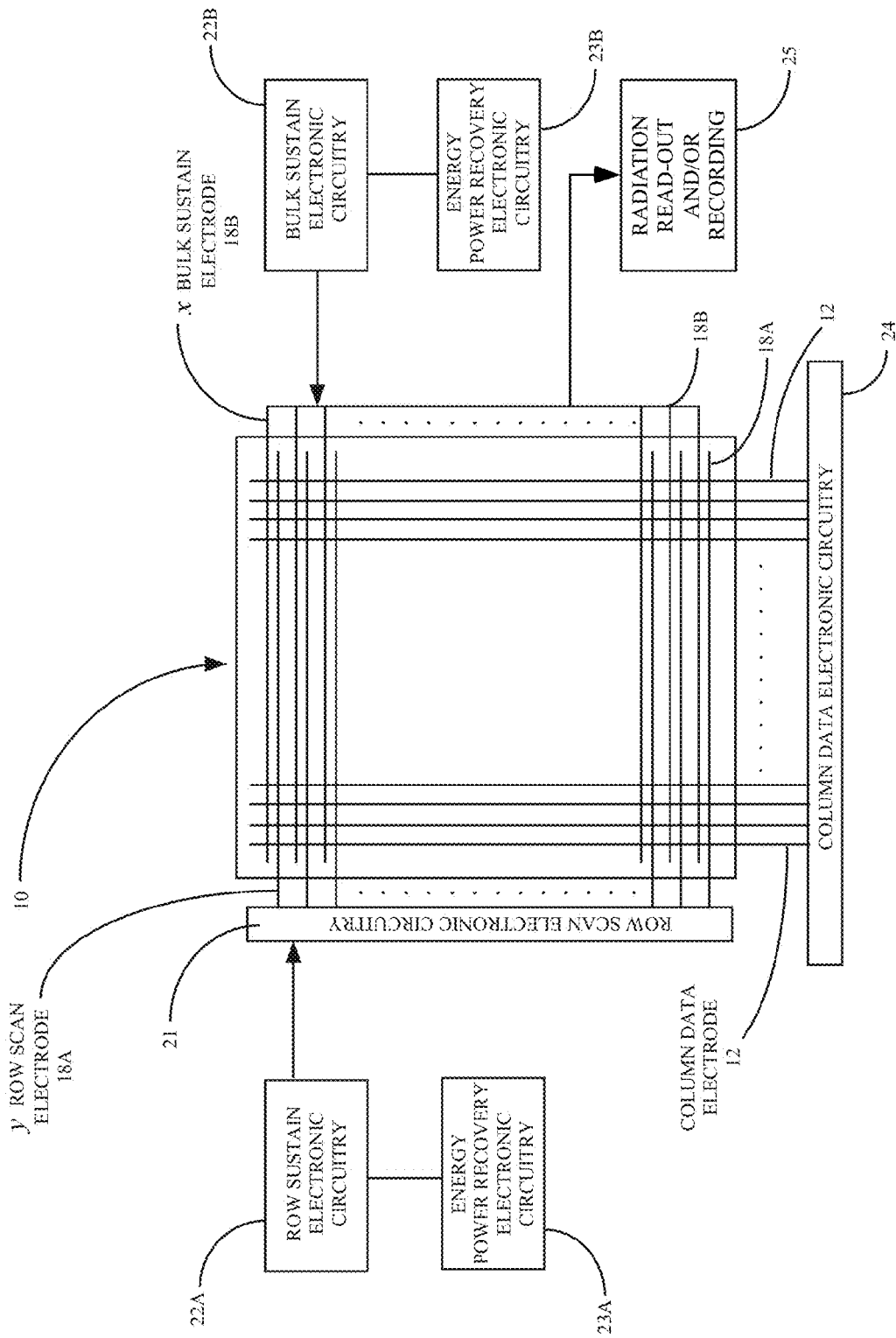
FIG. 12 is a block diagram of a gas discharge device with electronic circuitry.

In one embodiment, the gas discharge detector device with the detector shells is operated with electronics. Driving the detector shells slightly below the firing or discharge voltage increases the sensitivity of the detector shell to the high energy transmissions. FIG. 12 is a block diagram of a gas discharge device 10 with electronic circuitry 21 for y row scan electrodes 18A, bulk sustain electronic circuitry 22B for x bulk sustain electrode 18B and column data electronic circuitry 24 for the column data electrodes 12. The pixels or sub-pixels of the device comprise detector plasma-shells not shown in FIG. 12. There is also shown row sustain electronic circuitry 22A with an energy power recovery electronic circuit 23A. There is also shown energy power recovery electronic circuitry 23B for the bulk sustain electronic circuitry 22B. The electronics architecture used in FIG. 12 may be as described in U.S. Pat. No. 5,661,500 (Shinoda et al.). In addition, other architectures known in the prior art may be utilized. These architectures including Shinoda et al. (500) may be used to address detector plasma-shells, including detector plasma-spheres, detector plasma-discs, or detector plasma-domes in a gas discharge radiation detector device. Radiation read-out and/or recording 25 is also shown.

ADS

A basic electronics architecture for addressing and sustaining a surface discharge AC gas discharge device such as a PDP is called Address Display Separately (ADS). The ADS architecture may be used for a monochrome or multicolor display. ADS is disclosed in a number of Fujitsu patents including U.S. Pat. No. 5,541,618 (Shinoda) and U.S. Pat. No. 5,724,054 (Shinoda) of Fujitsu Ltd., Kawasaki, Japan and incorporated herein by reference. Also see U.S. Pat. No. 5,446,344 (Kanazawa) and U.S. Pat. No. 5,661,500 (Shinoda et al.), incorporated herein by reference. ADS is a basic electronic architecture widely used in the AC plasma display industry for the manufacture of PDP monitors and television.

The ADS architecture is also widely used by other manufacturers including Matsushita. ADS is disclosed in U.S. Pat. No. 5,745,086 (Weber), incorporated herein by reference. See FIGS. 2, 3, 11 of Weber (086). The ADS method of addressing and sustaining a surface discharge gas discharge device as disclosed in Shinoda (618) and (054) sustains the entire panel (all rows) after the addressing of the entire panel. The addressing and sustaining are done separately and are not done simultaneously. ADS may be used to address plasma-shells in a gas discharge radiation detector.

ALIS

This invention may also use the so-called shared electrode or electronic ALIS drive system disclosed by Fujitsu in U.S. Pat. No. 6,489,939 (Asso et al.), U.S. Pat. No. 6,498,593 (Fujimoto et al.), U.S. Pat. No. 6,531,819 (Nakahara et al.), U.S. Pat. No. 6,559,814 (Kanazawa et al.), U.S. Pat. No. 6,577,062 (Itokawa et al.), U.S. Pat. No. 6,603,446 (Kanazawa et al.), U.S. Pat. No. 6,630,790 (Kanazawa et al.), U.S. Pat. No. 6,636,188 (Kanazawa et al.), U.S. Pat. No. 6,667,579 (Kanazawa et al.), U.S. Pat. No. 6,667,728 (Kanazawa et al.), U.S. Pat. No. 6,703,792 (Kawada et al.), and U.S. Patent Application Publication 2004/0046509 (Sakita), all incorporated herein by reference. ALIS may be used to address plasma-shells in a gas discharge radiation detector.

AWD

Another electronic architecture is Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. No. 3,801,861 (Petty et al.) and U.S. Pat. No. 3,803,449 (Schmersal), both incorporated herein by reference. FIGS. 1 and 3 of the Shinoda (054) ADS patent disclose AWD architecture as prior art.

The AWD electronics architecture for addressing and sustaining monochrome PDP has also been adopted for addressing and sustaining multicolor PDP. For example, Samsung Display Devices Co., Ltd., has disclosed AWD and the superimpose of address pulses with the sustain pulse. Samsung specifically labels this as Address While Display (AWD). See Ryeom, J. et al. "High-Luminance and High-Contrast HDTV PDP with Overlapping Driving Scheme", *Proceedings of the Sixth International Display Workshops*, IDW 99, Sendai, Japan (Dec. 1-3, 1999): 743-746. and AWD as disclosed in U.S. Pat. No. 6,208,081 (Eo et al.), incorporated herein by reference.

LG Electronics Inc. has disclosed a variation of AWD with a Multiple Addressing in a Single Sustain (MASS) in U.S. Pat. No. 6,198,476 (Hong et al.), incorporated herein by reference. Also see U.S. Pat. No. 5,914,563 (Lee et al.), incorporated herein by reference. AWD may be used to address plasma-shells.

An AC voltage refresh technique or architecture is disclosed by U.S. Pat. No. 3,958,151 (Yano et al.), incorporated herein by reference. In one embodiment of this invention the plasma-shells are filled with pure neon and operated with the architecture of Yano (151).

There are a number of ways to drive a plasma-shell gas discharge device including a high frequency mode that allows for 1000 gray scales at 1000 Hz. In this mode, a single display driver output controls a single plasma-shell.

Energy Recovery

Energy recovery is used for the efficient operation of a gas discharge device such as a PDP. Examples of energy recovery architecture and circuits are well known in the prior art. These include U.S. Pat. No. 4,772,884 (Weber et al.), U.S. Pat. No. 4,866,349 (Weber et al.), U.S. Pat. No. 5,081,400 (Weber et al.), U.S. Pat. No. 5,438,290 (Tanaka), U.S. Pat. No. 5,642,018 (Marcotte), U.S. Pat. No. 5,670,974 (Ohba et al.), U.S. Pat. No. 5,808,420 (Rilly et al.) and U.S. Pat. No. 5,828,353 (Kishi et al.), all incorporated herein by reference.

Slow Ramp Reset

Slow rise slopes or ramps may be used in the practice of this invention. The prior art discloses slow rise slopes or ramps for the addressing of AC plasma displays. The early patents include U.S. Pat. No. 4,063,131 (Miller), U.S. Pat. No. 4,087,805 (Miller), U.S. Pat. No. 4,087,807 (Miavecz), U.S. Pat.

No. 4,611,203 (Criscimagna et al.), and U.S. Pat. No. 4,683,470 (Criscimagna et al.), all incorporated herein by reference.

An architecture for a slow ramp reset voltage is disclosed in U.S. Pat. No. 5,745,086 (Weber), incorporated herein by reference. Weber (086) discloses ramp voltages that exhibit a slope that is set to assure that current flow through each display pixel site remains in a positive resistance region of the gas discharge. U.S. Pat. No. 6,738,033 (Hibino et al.) also discloses architecture for a slow ramp reset voltage and is incorporated herein by reference.

SAS

SAS electronic architecture may be used to address a gas discharge device such as an AC surface discharge PDP panel constructed of plasma-shells. SAS architecture comprises addressing one section of a gas discharge device while another section of the device is being simultaneously sustained. This architecture is called Simultaneous Address and Sustain (SAS). SAS offers a unique electronic architecture which is different from prior art columnar discharge and surface discharge electronics architectures including ADS, AWD, and MASS. It offers important advantages as discussed herein.

In a surface gas discharge device, addressing voltage waveforms are applied to a surface discharge device having an array of data electrodes on a bottom or rear substrate and an array of at least two electrodes on a top or front viewing substrate, one top electrode being a bulk sustain electrode x and the other top electrode being a row scan electrode y. The row scan electrode y are also called a row sustain electrode because it performs the dual functions of both addressing and sustaining.

SAS allows selectively addressing of one section of a surface gas discharge device with selective write and/or selective erase voltages while another section of the panel is being simultaneously sustained. A section is defined as a predetermined number of bulk sustain electrodes x and row scan electrodes y. In a surface discharge device, a single row is comprised of one pair of parallel top electrodes x and y.

In one embodiment, there is provided the simultaneous addressing and sustaining of at least two sections $S_1$ and $S_2$ of a surface discharge device having a row scan, bulk sustain, and data electrodes, which comprises addressing one section $S_1$ of the device while a sustaining voltage is being simultaneously applied to at least one other section $S_2$ of the device. In another embodiment, the simultaneous addressing and sustaining is interlaced whereby one pair of electrodes y and x is addressed without being sustained and an adjacent pair of electrodes y and x is simultaneously sustained without being addressed. This interlacing can be repeated throughout the device. A section S is defined as one or more pairs of interlaced y and x electrodes.

In the practice of SAS, the row scan and bulk sustain electrodes of one section that is being sustained may have a reference voltage which is offset from the voltages applied to the data electrodes for the addressing of another section such that the addressing does not electrically interact with the row scan and bulk sustain electrodes of the section which is being sustained. In a plasma display device in which gray scale is realized through time multiplexing, a frame or a field of picture data is divided into subfields. Each subfield is typically composed of a reset period, an addressing period, and a number of sustains. The number of sustains in a subfield corresponds to a specific gray scale weight. Pixels that are selected to be "on" in a given subfield will be illuminated proportionally to the number of sustains in the subfield. In the course of one frame, pixels may be selected to be "on" or "off" for the various subfields. A gray scale image is realized by integrating in time the various "on" and "off" pixels of each of the subfields.

Addressing is the selective application of data to individual pixels. It includes the writing or erasing of individual pixels.

Reset is a voltage pulse, which forms wall charges to enhance the addressing of a pixel. It can be of various waveform shapes and voltage amplitudes including fast or slow rise time voltage ramps and exponential voltage pulses. A reset is typically used at the start of a frame before the addressing of a section. A reset may also be used before the addressing period of a subsequent subfield.

In accordance with another embodiment of the SAS architecture, there is applied a slow rise time or slow ramp reset voltage as disclosed in U.S. Pat. No. 5,745,086 (Weber) cited above and incorporated herein by reference. As used herein slow rise time or slow ramp voltage is a bulk address commonly called a reset pulse with a positive or negative slope so as to provide a uniform wall charge at all pixels in the device. The slower the rise time of the reset ramp, the less visible the light or background glow from those off-pixels (not in the on-state) during the slow ramp bulk address.

Less background glow is particularly desirable for increasing the contrast ratio, which is inversely proportional to the light-output from the off pixels during the reset pulse. Those off-pixels which are not in the on-state will give a background glow during the reset. The slower the ramp, the less light output with a resulting higher contrast ratio. Typically the slow ramp reset voltages disclosed in the prior art have a slope of about 3.5 volts per microsecond with a range of about 2 to about 9 volts per microsecond. In the SAS architecture, it is possible to use slow ramp reset voltages below 2 volts per microsecond, for example about 1 to 1.5 volts per microsecond without decreasing the number of device rows, without decreasing the number of sustain pulses or without decreasing the number of subfields.

Positive Column Gas Discharge

In one embodiment, it is contemplated that the gas discharge device may be operated with positive column discharge. Each plasma-shell is operated with positive column gas discharge, for example as disclosed by Weber, Rutherford, and other prior art cited herein and incorporated by reference. The discharge length inside the plasma-shell must be sufficient to accommodate the length of the positive column gas discharge.

U.S. Pat. No. 6,184,848 (Weber) discloses the generation of a positive column plasma discharge wherein the plasma discharge evidences a balance of positively charged ions and electrons. The PDP discharge operates using the same fundamental principle as a fluorescent lamp, i.e., a PDP employs ultraviolet light generated by a gas discharge to excite visible light-emitting phosphors.

James C. Rutherford, "PDP With Improved Drive Performance at Reduced Cost", *Proceedings of the Ninth International Display Workshops*, Hiroshima, Japan (Dec. 4-6, 2002); pages 837-840, discloses an electrode structure and electronics for a positive column plasma display. Rutherford discloses the use of the isolation bar as an active electrode.

Other positive column gas discharge prior art incorporated herein by reference include:

Weber, Larry F., "Positive Column AC Plasma Display", 23$^{rd}$ *International Display Research Conference Proceedings*, Phoenix, Ariz., IDRC 03, (Sep. 16-18, 2003): 119-124

Nagorny et al. "Dielectric Properties and Efficiency of Positive Column AC PDP.", 23$^{rd}$ *International Display Research Conference*, IDRC 03, Phoenix, Ariz. (Sep. 16-18, 2003) P-45: 300-303

Drallos et al. "Simulations of AC PDP Positive Column and Cathode Fall Efficiencies," 23$^{rd}$ *International Display Research Conference Proceedings*, IDRC 03, Phoenix, Ariz. (Sep. 16-18, 2003) P-48: 304-306

U.S. Pat. No. 6,376,995 (Kato et al.)
U.S. Pat. No. 6,528,952 (Kato et al.)
U.S. Pat. No. 6,693,389 (Marcotte et al.)
U.S. Pat. No. 6,768,478 (Wani et al.)
U.S. Patent Application Publication 2003/0102812 (Marcotte et al.)

Radio Frequency

The plasma-shells may be operated with radio frequency (RF). The RF may especially be used to sustain the plasma discharge. The use of RF in a PDP is disclosed in the following prior art, all incorporated herein by reference: U.S. Pat. No. 6,271,810 (Yoo et al.); U.S. Pat. No. 6,340,866 (Yoo); U.S. Pat. No. 6,473,061 (Lim et al.); U.S. Pat. No. 6,476,562 (Yoo et al.); U.S. Pat. No. 6,483,489 (Yoo et al.); U.S. Pat. No. 6,501,447 (Kang et al.); U.S. Pat. No. 6,605,897 (Yoo); U.S. Pat. No. 6,624,799 (Kang et al.); U.S. Pat. No. 6,661,394 (Choi.); and U.S. Pat. No. 6,794,820 (Kang et al.).

Plasma-Shell Materials

The plasma-shell is constructed of any suitable material such as glass, ceramic, plastic, metal, metalloid, and so forth. The plasma-shell may be made wholly or in part of a radiation detecting or sensing substance. The plasma-shell may be made of any suitable inorganic compounds of metals and/or metalloids including mixtures or combinations thereof. Contemplated inorganic compounds include the oxides, carbides, nitrides, nitrates, silicates, silicides, aluminates, phosphates, sulfates, sulfides, borates, and borides.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, bismuth, and lithium.

Inorganic shell materials suitable for use are magnesium oxide(s), aluminum oxide(s), zirconium oxide(s), and silicon carbide(s) such as MgO, $Al_2O_3$, $ZrO_2$, $SiO_2$, and/or SiC.

In one embodiment, the shell is composed wholly or in part of one or more borides of one or more members of Group IIIB of the Periodic Table and/or the rare earths including both the Lanthanide Series and the Actinide Series of the Periodic Table. Contemplated Group IIIB borides include scandium boride and yttrium boride. Contemplated rare earth borides of the Lanthanides and Actinides include lanthanum boride, cerium boride, praseodymium boride, neodymium boride, gadolinium boride, terbium boride, actinium boride, and thorium boride.

In another embodiment, the shell is composed wholly or in part of one or more Group IIIB and/or rare earth hexaborides with the Group IIIB and/or rare earth element being one or more members selected from Sc, Y, La, Ce, Pr, Nd, Sm, Eu, Gd, Tb, Dy, Ho, Yb, Ac, Th, Pa, and U. Examples include lanthanum hexaboride, cerium hexaboride, and gadolinium hexaboride.

Rare earth borides, including rare earth hexaboride compounds, and methods of preparation are disclosed in U.S. Pat. No. 3,258,316 (Tepper et al.), U.S. Pat. No. 3,784,677 (Versteeg et al.), U.S. Pat. No. 4,030,963 (Gibson et al.), U.S. Pat. No. 4,260,525 (Olsen et al.), U.S. Pat. No. 4,999,176 (Iltis et al.), U.S. Pat. No. 5,238,527 (Otani et al.), U.S. Pat. No. 5,336,362 (Tanaka et al.), U.S. Pat. No. 5,837,165 (Otani et al.), and U.S. Pat. No. 6,027,670 (Otani et al.), all incorporated herein by reference.

Group IIA alkaline earth borides are contemplated including borides of Mg, Ca, Ba, and Sr. In one embodiment, there is used a material containing trivalent rare earths and/or trivalent metals such as La, Ti, V, Cr, Al, Ga, and so forth having crystalline structures similar to the perovskite structure, for example as disclosed in U.S. Pat. No. 3,386,919 (Forrat), incorporated herein by reference.

The shell may also be composed of or contain carbides, borides, nitrides, silicides, sulfides, oxides and other compounds of metals and/or metalloids of Groups IV and V as disclosed and prepared in U.S. Pat. No. 3,979,500 (Sheppard et al.), incorporated herein by reference. Group IV compounds including borides of Group IVB metals such as titanium, zirconium, hafnium, and Group VB metals such as vanadium, niobium, and tantalum are contemplated.

The plasma-shell may be made of fused particles of glass, ceramic, glass ceramic, refractory, fused silica, quartz, or like amorphous and/or crystalline materials including mixtures of such. In one embodiment, a ceramic material is selected based on its transmissivity to light after firing. This may include selecting ceramics material with various optical cut-off frequencies to produce various colors. One material contemplated for this application is aluminum oxide. Aluminum oxide is transmissive from the UV range to the IR range. Because it is transmissive in the UV range, phosphors excited by UV may be applied to the exterior of the plasma-shell to produce various colors. The application of the phosphor to the exterior of the plasma-shell may be done by any suitable means before or after the plasma-shell is located or positioned in the PDP, i.e., on a flexible, semi-flexible, or rigid substrate. There may be applied several layers or coatings of phosphors, each of a different composition.

In one embodiment, the plasma-shell is made of an aluminate silicate or contains a layer of aluminate silicate. When the ionizable gas mixture contains helium, the aluminate silicate is especially beneficial in preventing the escaping of helium. It is also contemplated that the plasma-shell may be made of lead silicates, lead phosphates, lead oxides, borosilicates, alkali silicates, aluminum oxides, and pure vitreous silica.

For secondary electron emission, the plasma-shell may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, aluminates, phosphates, borates, and other inorganic compounds of the above and other elements. Hexaborides of rare earths are contemplated including lanthanum hexaboride, cerium hexaboride, and gadolinium hexaboride.

The plasma-shell may also contain or be partially or wholly constructed of luminescent substances such as inorganic phosphor(s). The phosphor may be a continuous or discontinuous layer or coating on the interior or exterior of the shell. Phosphor particles may also be introduced inside the plasma-shell or embedded within the shell. Luminescent quantum dots may also be incorporated into the shell.

Secondary Electron Emission

The use of secondary electron emission (Townsend coefficient) materials in a plasma display is well known in the prior art and is disclosed in U.S. Pat. No. 3,716,742 (Nakayama et al.) The use of Group IIA compounds including magnesium oxide is disclosed in U.S. Pat. Nos. 3,836,393 and 3,846,171, incorporated herein by reference. The use of rare earth compounds in an AC plasma display is disclosed in U.S. Pat. Nos. 4,126,807, 4,126,809, and 4,494,038, all issued to Donald K. Wedding et al., and incorporated herein by reference. Rare earth hexaborides are especially contemplated. Lead oxide may also be used as a secondary electron material. Mixtures of secondary electron emission materials may be used.

In one embodiment, the secondary electron emission material is magnesium oxide on part or all of the internal surface of a plasma-shell. The secondary electron emission material may also be on the external surface. The thickness of the magnesium oxide may range from about 250 Angstrom Units (Å) to about 20,000 Angstrom Units (Å) or more. The plasma-shell may be made of a secondary electronic material such as magnesium oxide. A secondary electron material may also be dispersed or suspended as particles within the ionizable gas such as with a fluidized bed. Phosphor particles may also be dispersed or suspended in the gas such as with a fluidized bed, and may also be added to the inner or external surface of the plasma-shell.

Magnesium oxide increases the ionization level through secondary electron emission that in turn leads to reduced gas discharge voltages. In one embodiment, the magnesium oxide is on the inner surface of the plasma-shell and the phosphor is located on external surface of the plasma-shell. Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a plasma-shell minimizes exposure of the magnesium oxide to contamination. The magnesium oxide may be applied to the inside of the plasma-shell by incorporating magnesium vapor as part of the ionizable gases introduced into the plasma-shell while the microsphere is at an elevated temperature. The magnesium may be oxidized while at an elevated temperature.

In some embodiments, the magnesium oxide may be added as particles to the gas. Other secondary electron materials may be used in place of or in combination with magnesium oxide. In one embodiment hereof, the secondary electron material such as magnesium oxide or any other selected material such as magnesium to be oxidized in situ is introduced into the gas by means of a fluidized bed. Other materials such as phosphor particles or vapor may also be introduced into the gas with a fluid bed or other means.

Detector Materials

The detector shell may be made wholly or in part of one or more substances or materials that detect or sense radiation. Such substances include both inorganic and organic materials including secondary electron emission materials. The detector shell may be made wholly or in part of one or more solid state semiconductor neutron detectors such as compounds of lithium, boron, cadmium, and gadolinium.

Examples of detector materials include lithium-6, lithium iodide, lithium fluoride, lithium gadolinium borate, lithium lanthanide borate, lithium indium sulfide, lithium indium selenide, lithium indium phosphide, boron-10, boron phosphide, boron carbide, boron nitride, cadmium zinc telluride, gadolinium arsenide, gadolinium orthosilicate, mercuric iodide, lead iodide, thallium bromide, thallium bromoiodide, mercuric bromoiodide, germanium, sodium iodide, cesium iodide, anthracene, bismuth germanium oxide, cerium iodide, indium iodide, and lutetium orthosilicate.

Radiation detection substances and materials are disclosed in U.S. Pat. No. 4,481,421 (Young et al.), U.S. Pat. No. 4,750,081 (Zhang et al.), U.S. Pat. No. 5,973,328 (Hiller), U.S. Pat. No. 6,080,989 (Royle et al.), U.S. Pat. No. 6,011,265 (Sauli), U.S. Pat. No. 6,274,462 (Fiorini et al.), U.S. Pat. No. 6,355,932 (Frederick), U.S. Pat. No. 6,529,573 (Olsher et al.), U.S. Pat. No. 6,654,435 (Kronenberg et al.), U.S. Pat. No. 6,678,343 (Kronenberg et al.), U.S. Pat. No. 6,771,730 (Dowben et al.), U.S. Pat. No. 7,317,195 (Eikman), and U.S. Pat. No. 7,320,896 (Fiorini et al.), all incorporated herein by reference.

Luminescent substances are contemplated including BaF-Br:$Eu^{2+}$ as disclosed in U.S. Pat. No. 6,998,624 (Katagirl), incorporated herein by reference.

Organic substances including polymeric materials may be used for detecting radiation. The organic substance are incorporated into the detector shell or applied as a detector coating on the surface of the detector shell. In one embodiment, there is used π-conjugated polymers and polyaromatic hydrocarbons such as naphthalene, anthracene, rubrene, and quinolates as disclosed in U.S. Pat. No. 7,186,987 (Doty et al.), incorporated herein by reference.

Conductive Shell

The shell may be made, wholly or in part, of a conductive material as discussed below. The shell material(s) can include conductive materials particularly metals or metalloid oxides, such as used for electrodes, especially the cathode. The following references disclose conductive materials that can be used in the shell and/or electrodes.

U.S. Pat. No. 6,797,662 (Jaffrey) discloses electrically conductive ceramics. A metal oxide ceramic material such as alumina may be rendered electrically conductive through its thickness by the incorporation of silver into the material. U.S. Pat. No. 6,631,062 (Minamisawa et al.) discloses an electrically conductive ceramic material and a process of producing same. The material comprises a compound containing at least one element belonging to the Group IIIA of the Periodic Table and $TiO_{2-x}$ where ($0<x<2$) is in a range such that the $TiO_{2-x}$ ($0<x<2$) accounts for 1 to 60 percent by weight of the total amount of the ceramics, and at least part of the compound and the $TiO_{2-x}$ form a composite oxide. U.S. Pat. No. 6,531,408 (Iwata et al.) discloses a method for growing zinc oxide based semi-conductor layers. U.S. Pat. No. 6,146,552 (Iga et al.) discloses a method for producing zinc oxide for low and high voltages. U.S. Pat. No. 5,770,113 (Iga et al.) and U.S. Pat. No. 5,739,742 (Iga et al.) disclose zinc oxide compositions including methods of preparation.

U.S. Pat. No. 5,795,502 (Terashi et al.) discloses electrically conducting ceramics and/or process for producing the same. The electrically conducting ceramics have as a chief crystalline phase a perovskite crystalline phase containing La, Cr and Mg and also having, in addition to the chief crystalline phase, an oxide phase containing La. The ceramics are dense, exhibit excellent sintering properties at low temperatures, have high electrical conductivity, and remain stable in a reducing atmosphere. U.S. Pat. No. 5,656,203 (Mikesha) and U.S. Pat. No. 5,601,853 (Bednarz et al.) disclose electrically conductive ceramics with oxides of Al, Cr, and Mg such as alumina, chromia, and magnesia. Ceramics are disclosed which exhibit volume resistivities of 1012 ohm-cm or less at 20° C. and have excellent electrical stability and superior mechanical properties.

U.S. Pat. No. 5,604,048 (Nishihara et al.) discloses an electrically conducting ceramic having improved electrical conductivity, which comprises a perovskite-type composite oxide. U.S. Pat. No. 5,688,731 (Chatterjee et al.) discloses a ceramic composite containing doped zirconia having high electrical conductivity. These electrically conductive ceramics comprise tetragonal zirconia or a composite of zirconia-alumina and zirconium diboride. U.S. Pat. No. 5,397,920 (Tran) discloses light transmissive electrically conductive compositions including methods of preparation. U.S. Pat. No. 5,126,218 (Clarke) discloses a conductive ceramic substrate for batteries formed from a sub-stiochemetric titanium dioxide material. The disclosed preferred material is $TiO_x$, where x is in the region of 1.55 to 1.95.

U.S. Pat. No. 5,066,423 (Kubo et al.) discloses a conductive ceramic sintered body substantially free from large variation of electric resistivity, which consists essentially of: (a) a silicon nitride-base ceramic as a matrix; (b) 10% to 70% volume of a first conductive material which consists of one or more conductive compounds selected from carbides, nitrides, oxides and their composite compounds of transition metals in Groups IVA, VA and VIA of the Periodic Table; and (c) 0.1% to 50% volume of a second conductive material consisting of SiC; the first conductive material and the second conductive material serving to form paths for electric conduction. U.S. Pat. No. 4,795,723 (Nishikawa et al.) discloses an electrically conductive hot press sintered ceramic comprising boron nitride, titanium diboride and aluminum nitride and having a flexural strength of at least 900 kg/cm$^2$ with a specific resistance of 300 to 2,500 micro ohm-centimeter ($\mu\Omega$-cm). U.S. Pat. No. 4,645,622 (Keck) discloses an electrically conductive ceramic having the composition $La_x Ca_y MnO_3$ where x is 0.44 to 0.48, y is 0.42 to 0.50 and the sum of the mol numbers of La and Ca is between 1% to 15% (preferably about 10%) and smaller than the mol number of Mn.

U.S. Pat. No. 4,113,928 (Virkar et al.) discloses the preparation of dense, high strength, and electrically conductive ceramics containing β"-alumina. There is prepared a dense and strong polycrystalline β"-alumina-containing ceramic body exhibiting an electrical resistivity for sodium ion conduction at 300° C. of 9 ohm-cm or lower obtained directly after sintering and having a controlled fine microstructure exhibiting a uniform grain size under 50 micrometers. The reference discloses methods of uniformly distributing selected metal ions having a valence not greater than 2, e.g. lithium or magnesium, uniformly throughout the beta-type alumina composition prior to sintering to form β"-alumina. This uniform distribution allows more complete conversion of β-alumina to β"-alumina during sintering. As a result, the polycrystalline β"-alumina containing ceramic bodies obtained by these methods exhibit high density, low porosity, high strength, fine grain size (i.e. no grains over 25-50 micrometers with an average size under 5-10 micrometers), low electrical resistivity and a high resistance to degradation by water vapor in an ambient atmosphere.

Ionizable Gas

The encapsulated hollow plasma-shell contains one or more ionizable gas components. As used herein, ionizable gas or gas means one or more gas components. The gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof. Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of neon and argon, neon and xenon, neon and helium, neon and krypton, neon and radon, argon and xenon, argon and krypton, argon and helium, argon and radon, xenon and krypton, xenon and helium, xenon and radon, krypton and helium, krypton and radon, and helium and radon. Specific two-component gas mixtures (compositions) include about 1% to 90% atoms of argon with the balance xenon. Another two-component gas mixture is a mother gas of neon containing 0.01% to 25% atoms of xenon, argon, or krypton. This can also be a three-component gas, four-component gas, or five-component gas by using quantities of an additional gas or gases selected from xenon, argon, krypton, and/or helium. In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon, for example, as disclosed in U.S. Pat. Nos. 5,510,678 and 5,559,403 issued to Sakai et al., both incorporated herein by reference.

U.S. Pat. No. 4,081,712 (Bode et al.), incorporated herein by reference, discloses the addition of helium to a gaseous medium of 90% to 99.99% atoms of neon and 10% to 0.01% atoms of argon, xenon, and/or krypton. In one embodiment, there is used a high concentration of helium with the balance selected from one or more gases of neon, argon, xenon, and nitrogen as disclosed in U.S. Pat. No. 6,285,129 (Park) and incorporated herein by reference. Mercury may be added to the rare gas as disclosed in U.S. Pat. No. 4,041,345 (Sahni), incorporated herein by reference.

A high concentration of xenon may also be used with one or more other gases as disclosed in U.S. Pat. No. 5,770,921 (Aoki et al.), incorporated herein by reference. Pure neon may be used and the plasma-shells operated without memory margin using the architecture disclosed by U.S. Pat. No. 3,958,151 (Yano) discussed above and incorporated herein by reference.

Excimers

Excimer gases may also be used as disclosed in U.S. Pat. No. 4,549,109 (Nighan et al.) and U.S. Pat. No. 4,703,229 (Nighan et al.), both incorporated herein by reference. Nighan et al. (109) and (229) disclose the use of excimer gases formed by the combination of halides with inert gases. The halides include fluorine, chlorine, bromine, and iodine. The inert gases include helium, xenon, argon, neon, krypton, and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a gas discharge device.

Other Gases

A wide variety of gases are contemplated for the practice of this invention. Gases for detecting radiation and microwave transmissions include $C_2H_2$—$CF_4$—Ar mixtures as disclosed in U.S. Pat. No. 4,201,692 (Christophorou et al.) and U.S. Pat. No. 4,309,307 (Christophorou et al.), both incorporated herein by reference. Also contemplated are gases disclosed in U.S. Pat. No. 4,553,062 (Ballon et al.), incorporated herein by reference. Other gases include sulfur hexafluoride, HF, $H_2S$, $SO_2$, SO, $H_2O_2$, and so forth. In one embodiment, boron trifluoride ($BF_3$) is used for detecting radiation.

Gas Pressure

The use of plasma-shells allows the construction and operation of gas discharge devices including plasma displays with gas pressures at or above one atmosphere. In the prior art, gas discharge (plasma) displays are operated with the ionizable gas at a pressure below atmospheric. Gas pressures above atmospheric are not used in the prior art because of structural problems. Higher gas pressures above atmospheric may cause the display substrates to separate, especially at elevations of 4000 feet or more above sea level. In the practice of this invention, the gas pressure inside of each hollow plasma-shell may be equal to or less than atmospheric pressure or may be equal to or greater than atmospheric pressure. The typical sub-atmospheric pressure is about 150 to 760 Torr. However, pressures above atmospheric may be used depending upon the structural integrity of the plasma-shell. In one embodiment, the gas pressure inside of the plasma-shell is equal to or less than atmospheric, about 150 to 760 Ton, typically about 350 to about 650 Torr. In another embodiment, the gas pressure inside of the plasma-shell is equal to or greater than atmospheric. Depending upon the structural strength of the plasma-shell, the pressure above atmospheric may be about 1 to 250 atmospheres (760 to 190,000 Torr) or greater. Higher gas pressures increase the luminous efficiency of the plasma display.

Structure

In one embodiment, the substrates containing plasma-shells are tiled to form a single substrate or monolithic gas discharge structure. Single substrate gas discharge structures are disclosed in U.S. Pat. No. 3,646,384 (Lay), U.S. Pat. No. 3,652,891 (Janning), U.S. Pat. No. 3,666,981 (Lay), U.S. Pat. No. 3,811,061 (Nakayama et al.), U.S. Pat. No. 3,860,846 (Mayer), U.S. Pat. No. 3,885,195 (Amano), U.S. Pat. No. 3,935,494 (Dick et al.), U.S. Pat. No. 3,964,050 (Mayer), U.S. Pat. No. 4,106,009 (Dick), U.S. Pat. No. 4,164,678 (Biazzo et al.), and U.S. Pat. No. 4,638,218 (Shinoda), all cited above and incorporated herein by reference. The plasma-shells may be positioned on the surface of the tiled substrates and/or positioned in the substrates such as in channels, trenches, grooves, wells, cavities, hollows, and so forth. These channels, trenches, grooves, wells, cavities, hollows, etc., may extend through the substrate so that the plasma-shells may detect or sense radiation from either side of the substrate.

The substrates containing plasma-shells may be tiled to form a dual substrate gas discharge structure. Each plasma-shell is placed inside of a gas discharge (plasma) device between opposing substrates, for example, on the substrate along the channels, trenches or grooves between the barrier walls of a plasma device barrier structure such as disclosed in U.S. Pat. No. 5,661,500 (Shinoda et al.), U.S. Pat. No. 5,674,553 (Shinoda et al.), and U.S. Pat. No. 5,793,158 (Wedding), cited above and incorporated herein by reference. The plasma-shells may also be positioned within a cavity, well, hollow, concavity, or saddle of a substrate, for example as disclosed by U.S. Pat. No. 4,827,186 (Knauer et al.), incorporated herein by reference.

In a device as disclosed by Wedding (158) or Shinoda et al. (500), the plasma-shells may be conveniently added to the substrate cavities and the space between opposing electrodes before the device is sealed. An aperture and tube can be used for bake out if needed of the space between the two opposing substrates, but the costly gas fill operation is eliminated. Gas discharge structures of 40 inches or larger are fragile with risk of breakage during in shipment and handling. The presence of the plasma-shells inside of the device adds structural support and integrity to the device. The plasma-shells may be sprayed, stamped, pressed, poured, screen-printed, or otherwise applied to the substrate. The substrate surface may contain an adhesive or sticky surface to bind the plasma-shell to the substrate. Typically the tiled substrate has flat surfaces. However, the practice of this invention is not limited to a flat substrate surface. The plasma-shell may be positioned or located on the tiled substrate so as to conform to a predetermined shape such as a curved or irregular surface.

Substrate

In accordance with various embodiments of this invention, the tiled substrates may be flexible, semi-flexible, or rigid. The substrate surface may be flat, curved, or irregular. The substrate may be opaque, transparent, translucent, or non-light transmitting. Substrates may be flexible or bendable films, such as a polymeric film substrate. The flexible substrate may also be made of metallic materials alone or incorporated into a polymeric substrate. Alternatively or in addition, one or both substrates may be made of an optically transparent thermoplastic polymeric material. Examples of suitable such materials are polycarbonate, polyvinyl chloride, polystyrene, polymethyl methacrylate, polyurethane polyimide, polyester, and cyclic polyolefin polymers. More broadly, the substrates may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference.

Alternatively, one or both of the tiled substrates may be made of a rigid material. For example, one or both of the substrates may be glass with a flat, curved, or irregular surface. The glass may be a conventionally available glass, for example having a thickness of approximately 0.2 mm-1 mm.

Alternatively, other suitable transparent materials may be used, such as a rigid plastic or a plastic film. The plastic film may have a high glass transition temperature, for example above 65° C., and may have a transparency greater than 85% at 530 nm. Further details regarding substrates and substrate materials may be found in International Publications Nos. WO 00/46854, WO 00/49421, WO 00/49658, WO 00/55915, and WO 00/55916, the entire disclosures of which are herein incorporated herein by reference. Apparatus, methods, and compositions for producing flexible substrates are disclosed in U.S. Pat. No. 5,469,020 (Herrick), U.S. Pat. No. 6,274,508 (Jacobsen et al.), U.S. Pat. No. 6,281,038 (Jacobsen et al.), U.S. Pat. No. 6,316,278 (Jacobsen et al.), U.S. Pat. No. 6,468,638 (Jacobsen et al.), U.S. Pat. No. 6,555,408 (Jacobsen et al.), U.S. Pat. No. 6,590,346 (Hadley et al.), U.S. Pat. No. 6,606,247 (Credelle et al.), U.S. Pat. No. 6,665,044 (Jacobsen et al.), and U.S. Pat. No. 6,683,663 (Hadley et al.), all of which are incorporated herein by reference.

Tiled Substrates

The substrates are tiled edge to edge using sealants such as polymeric seals including epoxy materials. Other sealing compounds include metallized film adhesives bonded to the tile edges and low temperature sintered sol-gel such as silica sol-gel.

The tiled substrates are sealed together edge to edge to form a self-supporting structure without the use of a supporting frame or other like support.

Tiling methods including sealing compounds and materials are disclosed in patents issued to Rainbow Displays, Endicott, N.Y. These include U.S. Pat. No. 6,693,684 (Greene et al.), U.S. Pat. No. 6,680,761 (Greene et al.), U.S. Pat. No. 6,639,643 (Babuka et al.), U.S. Pat. No. 6,476,886 (Krusius et al.), U.S. Pat. No. 6,262,696 (Seraphim et al.), U.S. Pat. No. 6,100,861 (Cohen et al.), U.S. Pat. No. 6,020,868 (Greene et al.), U.S. Pat. No. 6,005,649 (Krusius et al.), U.S. Pat. No. 5,963,281 (Koons et al.), U.S. Pat. No. 5,903,328 (Greene et al.), U.S. Pat. No. 5,889,568 (Seraphim et al.), U.S. Pat. No. 5,867,236 (Babuka et al.), U.S. Pat. No. 5,867,236 (Babuka et al.), U.S. Pat. No. 5,781,258 (Dabral et al.), U.S. Pat. No. 5,668,569 (Greene et al.), and U.S. Pat. No. 5,661,531 (Greene et al.), all incorporated herein by reference.

The tiling of the substrates may also be accomplished with a mullion made of any suitable material such as wood, stone, or a metal such as aluminum. Substrates may also be interconnected or inter-digitated through contacts along or on one or more edges. Mullions and other means for tiling substrates are disclosed in U.S. Pat. No. 7,592,970 (Matthies et al.), U.S. Pat. No. 7,394,194 (Cok), U.S. Pat. No. 7,358,929 (Mueller et al.), U.S. Pat. No. 7,295,179 (Dunn), U.S. Pat. No. 7,277,066 (Sundahl), U.S. Pat. No. 7,108,392 (Strip et al.), U.S. Pat. No. 6,999,138 (Cok), U.S. Pat. No. 6,940,501 (Seligson), U.S. Pat. No. 6,897,855 (Matthies et al.), U.S. Pat. No. 6,881,946 (Cok et al.), U.S. Pat. No. 6,870,519 (Sundahl), U.S. Pat. No. 6,690,337 (Mayer, III et al.), U.S. Pat. No. 6,683,665 (Matthies), U.S. Pat. No. 6,639,643 (Babuka et al.), U.S. Pat. No. 6,600,144 (Matthies), U.S. Pat. No. 6,571,043 (Lowry et al.), U.S. Pat. No. 6,498,592 (Matthies), U.S. Pat. No. 6,476,783 (Matthies et al.), U.S. Pat. No. 6,418,267 (Lowry), U.S. Pat. No. 6,396,985 (Lowry et al.), U.S. Pat. No. 6,262,696 (Seraphim et al.), U.S. Pat. No. 6,097,455 (Babuka et al.), U.S. Pat. No. 5,838,405 (Izumi et al.), U.S. Pat. No. 5,805,117 (Mazurek et al.), and U.S. Pat. No. 5,796,452 (Pierson), all incorporated herein by reference. Such are also disclosed in U.S. Patent Application Publication Nos. 2007/0103583 (Burnett et al.), 2007/0008259 (Barker), 2005/0134526 (Willem et al.), and European Patent Specification EP 0997865 (Tokimoto et al.), all incorporated herein by reference.

The substrates may be tiled to form a dome, a tunnel shape, or other structure suitable for detecting radiation for a source.

Positioning of Plasma-Shell on Substrate

Each plasma-shell detector is positioned or located in contact with the substrate by any appropriate means including bonding methods. The plasma-shell may be bonded to the substrate surface with a conductive material or non-conductive adhesive material that also serves as an insulating barrier to prevent electrically shorting of the conductors or electrodes connected to the plasma-shell.

The plasma-shell may also be mounted or positioned within a substrate well, cavity, hollow, hole, or like depression. The well, cavity, hollow, hole, or depression is of suitable dimensions with a mean or average diameter and depth for receiving and retaining the plasma-shell. As used herein well includes cavity, hollow, depression, hole, or any similar configuration. In U.S. Pat. No. 4,827,186 (Knauer et al.), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate.

The conductors or electrodes are in electrical contact with each plasma-shell. An air gap between an electrode and the plasma-shell will cause high operating voltages. A material such as a conductive adhesive, and/or a conductive filler may be used to bridge or connect the electrode to the plasma-shell. Such conductive material must be carefully applied so as to not electrically short the electrode to other nearby electrodes. A dielectric material may also be applied to fill any air gap. This also may be an adhesive.

Insulating Barrier

An insulating barrier may be used to electrically separate the plasma-shells and electrodes. It may also be used to bond each plasma-shell to the substrate. The insulating barrier may comprise any suitable non-conductive material, which bonds the plasma-shell to the substrate. In one embodiment, there is used an epoxy resin that is the reaction product of epichlorohydrin and bisphenol-A. One such epoxy resin is a liquid epoxy resin, D.E.R. 383, produced by the Dow Plastics group of the Dow Chemical Company.

Light Barrier

Light barriers of opaque, translucent, or non-transparent material may be located between plasma-shells to prevent optical cross-talk between plasma-shells, particularly between adjacent plasma-shells. A black light absorbing material such as carbon filler may be used. The light barrier may comprise a light reflective material.

Electrically Conductive Bonding Substance

The conductors or electrodes may be electrically connected to each plasma-shell with an electrically conductive bonding substance. This is applied to an exterior surface of the plasma-shell, to an electrode, and/or to the substrate surface. In one embodiment, it is applied to both the plasma-shell and the electrode.

The electrically conductive bonding substance can be any suitable inorganic or organic material including compounds, mixtures, dispersions, pastes, liquids, cements, and adhesives. In one embodiment, the electrically conductive bonding substance is an organic substance with conductive filler material. Contemplated organic substances include adhesive monomers, dimers, trimers, polymers and copolymers of materials such as polyurethanes, polysulfides, silicones, and epoxies. A wide range of other organic or polymeric materials may be used. Contemplated conductive filler materials include conductive metals or metalloids such as silver, gold, platinum, copper, chromium, nickel, aluminum, and carbon. The conductive filler may be of any suitable size and form such as particles, powder, agglomerates, or flakes of any suitable size and shape. It is contemplated that the particles, powder, agglomerates, or flakes may comprise a non-metal, metal, or metalloid core with an outer layer, coating, or film of conductive metal.

Specific embodiments of conductive filler materials include silver-plated copper beads, silver-plated glass beads, silver particles, silver flakes, gold-plated copper beads, gold-plated glass beads, gold particles, gold flakes, and so forth. In one particular embodiment of this invention there is used an epoxy filled with 60% to 80% by weight silver.

Examples of electrically conductive bonding substances are known in the art. The disclosures including the compositions of the following references are incorporated herein by reference. U.S. Pat. No. 3,412,043 (Gilliland) discloses an electrically conductive composition of silver flakes and resinous binder. U.S. Pat. No. 3,983,075 (Marshall et al.) discloses a copper filled electrically conductive epoxy. U.S. Pat. No. 4,247,594 (Shea et al.) discloses an electrically conductive resinous composition of copper flakes in a resinous binder. U.S. Pat. No. 4,552,607 (Frey) and U.S. Pat. No. 4,670,339 (Frey) disclose a method of forming an electrically conductive bond using copper microspheres in an epoxy. U.S. Pat. No. 4,880,570 (Sanborn et al.) discloses an electrically conductive epoxy-based adhesive selected from the amine curing modified epoxy family with a filler of silver flakes. U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids plated with silver. Other noble metals and non-noble metals such as nickel are disclosed. U.S. Pat. No. 5,298,194 (Carter et al.) discloses an electrically conductive adhesive composition comprising a polymer or copolymer of polyolefins or polyesters filled with silver particles. U.S. Pat. No. 5,575,956 (Hermansen et al.) discloses electrically-conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed. U.S. Pat. No. 5,891,367 (Basheer et al.) discloses a conductive epoxy adhesive comprising an epoxy resin cured or reacted with selected primary amines and filled with silver flakes. The primary amines provide improved impact resistance. U.S. Pat. No. 5,918,364 (Kulesza et al.) discloses substrate bumps or pads formed of electrically conductive polymers filled with gold or silver. U.S. Pat. No. 6,184,280 (Shibuta) discloses an organic polymer containing hollow carbon microfibers and an electrically conductive metal oxide powder. In another embodiment, the electrically conductive bonding substance is an organic substance without a conductive filler material. Examples of electrically conductive bonding substances are well known in the art. The disclosures including the compositions of the following references are incorporated herein by reference. Electrically conductive polymer compositions are also disclosed in U.S. Pat. No. 5,917,693 (Kono et al.), U.S. Pat. No. 6,096,825 (Garnier), and U.S. Pat. No. 6,358,438 (Isozaki et al.). The electrically conductive polymers disclosed above may also be used with conductive fillers. In some embodiments, organic ionic materials such as calcium stearate may be added to increase electrical conductivity. See U.S. Pat. No. 6,599,446 (Todt et al.), incorporated herein by reference. In one embodiment hereof, the electrically conductive bonding substance is luminescent, for example as disclosed in U.S. Pat. No. 6,558,576 (Brielmann et al.), incorporated herein by reference.

U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers, used to form these polymers.

EMI/RFI Shielding

In some embodiments, electroconductive bonding substances may be used for EMI (electromagnetic interference) and/or RFI (radio-frequency interference) shielding. Examples of such EMI/RFI shielding are disclosed in U.S. Pat. No. 5,087,314 (Sandborn et al.) and U.S. Pat. No. 5,700,398 (Angelopoulos et al.), both incorporated herein by reference.

Electrodes

One or more hollow plasma-shells containing the ionizable gas are located on or within each substrate in contact with one or more electrodes. In one embodiment, each plasma-shell is connected to two opposing electrodes which may be positioned on the sides of the plasma-shell so that the top and/or bottom of the plasma-shell are exposed to the radiation free of any obstruction from the electrodes. In another embodiment, three electrodes are attached to each plasma-shell. In still another embodiment, four electrodes are attached to each plasma-shell. In accordance with one embodiment of this invention, the contact is augmented with a supplemental electrically conductive bonding substance applied to each plasma-shell, to each electrode, and/or to the substrate so as to form an electrically conductive pad connection to the electrodes. A dielectric substance may also be used in lieu of or in addition to the conductive substance. Each conductive pad may partially cover an outside shell surface of the plasma-shell. The electrodes and pads may be of any geometric shape or configuration. In one embodiment the electrodes are opposing arrays of electrodes, one array of electrodes being transverse or orthogonal to an opposing array of electrodes. The electrode arrays can be parallel, zig zag, serpentine, or like pattern as typically used in dot-matrix gas discharge (plasma) displays. The use of split or divided electrodes is contemplated as disclosed in U.S. Pat. No. 3,603,836 (Grier) and U.S. Pat. No. 3,701,184 (Grier), incorporated herein by reference. Apertured electrodes may be used as disclosed in U.S. Pat. No. 6,118,214 (Marcotte) and U.S. Pat. No. 5,411,035 (Marcotte) and U.S. Patent Application Publication 2004/0001034 (Marcotte), all incorporated herein by reference. The electrodes are of any suitable conductive metal or alloy including gold, silver, aluminum, or chrome-copper-chrome. If a transparent electrode is used on the radiation detection surface, this is typically indium tin oxide (ITO) or tin oxide with a conductive side or edge bus bar of silver. Other conductive bus bar materials may be used such as gold, aluminum, or chrome-copper-chrome. The electrodes may partially cover the external surface of the plasma-shell.

The electrode array may be divided into two portions and driven from both sides with a dual scan architecture as disclosed by Dr. Thomas J. Pavliscak in U.S. Pat. Nos. 4,233,623 and 4,320,418, both incorporated herein by reference.

The electrodes may be applied to the substrate and/or to the plasma-shells by thin film methods such as vapor phase deposition, E-beam evaporation, sputtering, conductive doping, electrode plating, etc. or by thick film methods such as screen printing, ink jet printing, etc. A flat plasma-shell surface is particularly suitable for connecting electrodes to the plasma-shell. In a matrix arrangement, the electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. At least one hollow plasma-shell containing ionizable gas is positioned in the gas discharge (plasma) device at the intersection of at least two opposing electrodes. When an appropriate voltage potential is applied to an opposing pair of electrodes, the ionizable gas inside of the plasma-shell at the crossover is energized and a gas discharge occurs. Photons of light in the visible and/or invisible range are emitted by the gas discharge.

Shell Geometry

The detector plasma-shells are of any suitable volumetric shape or geometric configuration to encapsulate the ionizable gas independently of the substrate. Such include plasma-spheres, plasma-discs, and plasma-domes as disclosed above. The thickness of the wall of each hollow plasma-shell must be sufficient to retain the gas inside, but thin enough to allow passage of photons emitted by the gas discharge. The wall thickness of the plasma-shell should be kept as thin as practical to minimize photon absorption, but thick enough to retain sufficient strength so that the plasma-shells can be easily handled and pressurized.

Luminescent Substances

The detector plasma-shells may contain an organic and/or inorganic luminescent substance or material. Organic and/or inorganic luminescent substances or materials may be used as visual indicators of radiation detection by the device and/or as detectors of radiation alone or in combination with the gas. Organic luminescent substances or materials such as organic phosphors may be used alone or in combination with inorganic luminescent substances. Contemplated combinations include mixtures and/or selective layers of organic and inorganic substances. In one embodiment, an organic and/or inorganic luminescent substance is located in close proximity to the enclosed gas discharge within a plasma-shell, so as to be excited by photons from the enclosed gas discharge. In another embodiment, an organic and/or inorganic photoluminescent substance is positioned on at least a portion of the external surface of a plasma-shell so as to be excited by photons from the gas discharge within the plasma-shell such that the excited photoluminescent substance emits visible and/or invisible light. Some typical organic and/or inorganic luminescent substances are listed below.

Organic Luminescent Substances

As used herein organic luminescent substance or material comprises one or more organic compounds, monomers, dimers, trimers, polymers, copolymers, or like organic materials, which emit visible and/or invisible light when excited by photons from the gas discharge inside of the plasma-shell. Such organic luminescent substances may include one or more organic photoluminescent phosphors selected from organic photoluminescent compounds, organic photoluminescent monomers, dimers, trimers, polymers, copolymers, organic photoluminescent dyes, organic photoluminescent dopants and/or any other organic photoluminescent substance. All are collectively referred to herein as organic photoluminescent phosphor.

Organic photoluminescent phosphor substances contemplated herein include those organic light-emitting diodes or devices (OLED) and organic electroluminescent (EL) materials, which emit light when excited by photons from the gas discharge of a gas plasma discharge. OLED and organic EL substances include the small molecule organic EL and the large molecule or polymeric OLED.

Small molecule organic EL substances are disclosed in U.S. Pat. No. 4,720,432 (VanSlyke et al.), U.S. Pat. No. 4,769,292 (Tang et al.), U.S. Pat. No. 5,151,629 (VanSlyke), U.S. Pat. No. 5,409,783 (Tang et al.), U.S. Pat. No. 5,645,948 (Shi et al.), U.S. Pat. No. 5,683,823 (Shi et al.), U.S. Pat. No. 5,755,999 (Shi et al.), U.S. Pat. No. 5,908,581 (Chen et al.), U.S. Pat. No. 5,935,720 (Chen et al.), U.S. Pat. No. 6,020,078 (Chen et al.), U.S. Pat. No. 6,069,442 (Hung et al.), U.S. Pat. No. 6,348,359 (VanSlyke et al.), and U.S. Pat. No. 6,720,090 (Young et al.), all incorporated herein by reference. The small molecule organic light-emitting devices may be called SMOLED.

Large molecule or polymeric OLED substances are disclosed in U.S. Pat. No. 5,247,190 (Friend et al.), U.S. Pat. No. 5,399,502 (Friend et al.), U.S. Pat. No. 5,540,999 (Yamamoto et al.), U.S. Pat. No. 5,900,327 (Pei et al.), U.S. Pat. No. 5,804,836 (Heeger et al.), U.S. Pat. No. 5,807,627 (Friend et al.), U.S. Pat. No. 6,361,885 (Chou), and U.S. Pat. No. 6,670,645 (Grushin et al.), all incorporated herein by reference. The polymer light-emitting devices may be called PLED. Organic luminescent substances also include OLEDs doped with phosphorescent compounds as disclosed in U.S. Pat. No. 6,303,238 (Thompson et al.), incorporated herein by reference. Organic photoluminescent substances are also disclosed in U.S. Patent Application Publication Nos. 2002/0101151 (Choi et al.), 2002/0063525 (Choi et al.), 2003/0003225 (Choi et al.); U.S. Pat. No. 6,610,554 (Yi et al.), U.S. Pat. No. 6,692,326 (Choi et al.), and U.S. Pat. No. 6,948,993 (Yi et al.); and International Publications WO 02/104077 and WO 03/046649, all incorporated herein by reference.

In one embodiment, the organic luminescent phosphorous substance is a color-conversion-media (CCM) that converts light (photons) emitted by the gas discharge to visible or invisible light. Examples of CCM substances include the fluorescent organic dye compounds.

In another embodiment, the organic luminescent substance is selected from a condensed or fused ring system such as a perylene compound, a perylene based compound, a perylene derivative, a perylene based monomer, dimer or trimer, a perylene based polymer, and/or a substance doped with a perylene.

Photoluminescent perylene phosphor substances are widely known in the prior art. U.S. Pat. No. 4,968,571 (Gruenbaum et al.), incorporated herein by reference, discloses photoconductive perylene materials, which may be used as photoluminescent phosphorous substances. U.S. Pat. No. 5,693,808 (Langhals), incorporated herein by reference, discloses the preparation of luminescent perylene dyes. U.S. Patent Application Publication 2004/0009367 (Hatwar), incorporated herein by reference, discloses the preparation of luminescent substances doped with fluorescent perylene dyes. U.S. Pat. No. 6,528,188 (Suzuki et al.), incorporated herein by reference, discloses the preparation and use of luminescent perylene compounds.

These condensed or fused ring compounds are conjugated with multiple double bonds and include monomers, dimers, trimers, polymers, and copolymers. In addition, conjugated aromatic and aliphatic organic compounds are contemplated including monomers, dimers, trimers, polymers, and copolymers. Conjugation as used herein also includes extended conjugation. A material with conjugation or extended conjugation absorbs light and then transmits the light to the various conjugated bonds. Typically the number of conjugate-double bonds ranges from about 4 to about 15. Further examples of conjugate-bonded or condensed/fused benzene rings are disclosed in U.S. Pat. No. 6,614,175 (Aziz et al.) and U.S. Pat. No. 6,479,172 (Hu et al.), both incorporated herein by reference. U.S. Patent Application Publication 2004/0023010 (Bulovic et al.) discloses luminescent nanocrystals with organic polymers including conjugated organic polymers. Cumulene is conjugated only with carbon and hydrogen atoms. Cumulene becomes more deeply colored as the conjugation is extended. Other condensed or fused ring luminescent compounds may also be used including naphthalimides, substituted naphthalimides, naphthalimide monomers, dimers, trimers, polymers, copolymers and derivatives thereof including naphthalimide diester dyes such as disclosed in U.S. Pat. No. 6,348,890 (Likavec et al.), incorporated herein by reference.

The organic luminescent substance may be an organic lumophore, for example as disclosed in U.S. Pat. No. 5,354,825 (Klainer et al.), U.S. Pat. No. 5,480,723 (Klainer et al.), U.S. Pat. No. 5,700,897 (Klainer et al.), and U.S. Pat. No. 6,538,263 (Park et al.), all incorporated herein by reference. Also lumophores are disclosed in Shaheen, S. E. et al. *Journal of Applied Physics* Vol. 84, Number 4 (Aug. 15, 1998): 2324-2327; Anderson, J. D. et al. *Journal of American Chemical Society* Vol. 120 (1998): 9646-9655; and Lee, Gyu Hyun et al. *Bulletin of Korean Chemical Society* Vol. 23, No. 3 (2002): 528-530, all incorporated herein by reference. The organic luminescent substance may be applied by any suitable method to the external surface of the plasma-shell, to the substrate or to any location in close proximity to the gas discharge contained within the plasma-shell.

Such methods include thin film deposition methods such as vapor phase deposition, sputtering and E-beam evaporation. Also thick film or application methods may be used such as screen-printing, ink jet printing, and/or slurry techniques. Small size molecule OLED materials are typically deposited upon the external surface of the plasma-shell by thin film deposition methods such as vapor phase deposition or sputtering. Large size molecule or polymeric OLED materials are deposited by so called thick film or application methods such as screen-printing, ink jet, and/or slurry techniques. If the organic luminescent substance such as a photoluminescent phosphor is applied to the external surface of the plasma-shell, it may be applied as a continuous or discontinuous layer or coating such that the plasma-shell is completely or partially covered with the luminescent substance.

Combining of Luminescent Substances

Inorganic luminescent substances or materials such as phosphors may be used alone or in combination with organic luminescent substances. Contemplated combinations include mixtures and/or selective layers of organic and/or inorganic substances. The detector shell may be made of one or more organic and/or inorganic luminescent substances. In one embodiment, the inorganic luminescent substance is incorporated into the particles forming the shell structure. Two or more luminescent substances may be used in combination with one luminescent substance emitting photons to excite another luminescent substance. In one embodiment, the shell is made of a luminescent substance with the shell exterior containing another luminescent substance. The luminescent shell is excited by photons from a gas discharge within the shell. The exterior luminescent substance produces photons when excited by photons from the excited luminescent shell. Typical inorganic luminescent substances are listed below.

Green Phosphor

A green light-emitting phosphor may be used alone or in combination with other light-emitting phosphors such as blue or red. Phosphor materials which emit green light include $Zn_2SiO_4$:Mn, ZnS:Cu, ZnS:Au, ZnS:Al, ZnO:Zn, CdS:Cu, $CdS:Al_2$, $Cd_2O_2S$:Tb, and $Y_2O_2S$:Tb. In one mode and embodiment of this invention using a green light-emitting phosphor, there is used a green light-emitting phosphor selected from the zinc orthosilicate phosphors such as $ZnSiO_4:Mn^{2+}$. Green light-emitting zinc orthosilicates including the method of preparation are disclosed in U.S. Pat. No. 5,985,176 (Rao), incorporated herein by reference. These phosphors have a broad emission in the green region when excited by 147 nm and 173 nm (nanometers) radiation from the discharge of a xenon gas mixture. In another mode and embodiment of this invention there is used a green light-emitting phosphor which is a terbium activated yttrium gadolinium borate phosphor such as $(Gd, Y) BO_3:Tb^{3+}$. Green light-emitting borate phosphors including the method of preparation are disclosed in U.S. Pat. No. 6,004,481 (Rao), incorporated herein by reference. In another mode and embodiment there is used a manganese activated alkaline earth aluminate green phosphor as disclosed in U.S. Pat. No. 6,423,248 (Rao), peaking at 516 nm when excited by 147 and 173 nm radiation from xenon. The particle size ranges from 0.05 to 5 microns. Rao (248) is incorporated herein by reference. Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated. Green light-emitting terbium-activated lanthanum cerium orthophosphate phosphors are disclosed in U.S. Pat. No. 4,423,349 (Nakajima et al.), incorporated herein by reference. Green light-emitting lanthanum cerium terbium phosphate phosphors are disclosed in U.S. Pat. No. 5,651,920, incorporated herein by reference. Green light-emitting phosphors may also be selected from the trivalent rare earth ion-containing aluminate phosphors as disclosed in U.S. Pat. No. 6,290,875 (Oshio et al.), incorporated herein by reference.

Blue Phosphor

A blue light-emitting phosphor may be used alone or in combination with other light-emitting phosphors such as green or red. Phosphor materials which emit blue light include ZnS:Ag, ZnS:Cl, and CsI:Na. In one embodiment, there is used a blue light-emitting aluminate phosphor. An aluminate phosphor that emits blue visible light is divalent europium ($Eu^{2+}$) activated Barium Magnesium Aluminate (BAM) represented by $BaMgAl_{10}O_{17}:Eu^{2+}$. BAM is widely used as a blue phosphor in the PDP industry.

BAM and other aluminate phosphors which emit blue visible light are disclosed in U.S. Pat. No. 5,611,959 (Kijima et al.) and U.S. Pat. No. 5,998,047 (Bechtel et al.), both incorporated herein by reference. The aluminate phosphors may also be selectively coated as disclosed by Bechtel et al. (047). Blue light-emitting phosphors may be selected from a number of divalent europium-activated aluminates such as disclosed in U.S. Pat. No. 6,096,243 (Oshio et al.), incorporated herein by reference. The preparation of BAM phosphors for a PDP is also disclosed in U.S. Pat. No. 6,045,721 (Zachau et al.), incorporated herein by reference.

In one embodiment, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), incorporated herein by reference.

In another embodiment, a mixture or blend of blue-emitting phosphors is used such as a blend or complex of about 85 to 70 percent by weight of a lanthanum phosphate phosphor activated by trivalent thulium ($Tm^{3+}$), $Li^+$, and an optional amount of an alkaline earth element ($AE^{2+}$) as a coactivator and about 15 to 30 percent by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference. A blue BAM phosphor with partially substituted $Eu^{2+}$ is disclosed in U.S. Pat. No. 6,833,672 (Aoki et al.), incorporated herein by reference. Blue light-emitting phosphors also include $ZnO.Ga_2O_3$ doped with Na or Bi. The preparation of these phosphors is disclosed in U.S. Pat. No. 6,217,795 (Yu et al.) and U.S. Pat. No. 6,322,725 (Yu et al.), both incorporated herein by reference. Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S:Eu$ and $Y_2O_3S:Eu$. In a best mode and embodiment of this invention using a red light-emitting phosphor, there is used a red light-emitting phosphor which is an europium activated yttrium gadolinium borate phosphor such as $(Y,Gd)BO_3:Eu^{3+}$. The composition and preparation of these red light-emitting borate phosphors is disclosed in U.S. Pat. No. 6,042,747 (Rao) and U.S. Pat. No. 6,284,155 (Rao), both incorporated herein by reference. These europium activated yttrium, gadolinium borate phosphors emit an orange line at 593 nm and red emission lines at 611 nm and 627 nm when excited by 147 nm and 173 nm UV radiation from the discharge of a xenon gas mixture. For television (TV) applications, it is preferred to have only the red emission lines (611 nm and 627 nm). The orange line (593 nm) may be minimized or eliminated with an external optical filter. A wide range of red light-emitting phosphors are used in the PDP industry and are contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter. Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$. White light-emitting phosphors are disclosed in U.S. Pat. No. 6,200,496 (Park et al.), incorporated herein by reference. Pink light-emitting phosphors are disclosed in U.S. Pat. No. 6,200,497 (Park et al.), incorporated herein by reference. Phosphor material which emits yellow light include ZnS:Au.

Organic and Inorganic Luminescent Substances

Inorganic and organic luminescent substances may be used in a variety of combinations. In one embodiment, multiple layers of luminescent substances are applied to the detector shell with at least one layer being organic and at least one layer being inorganic. An inorganic layer may serve as a protective overcoat for an organic layer or vise-versa.

In another embodiment, the shell of the detector plasma-shell comprises or contains one or more inorganic luminescent substances with an organic luminescent substance on the exterior of the shell. In another embodiment, organic and inorganic luminescent substances are mixed together and applied as a layer inside or outside the shell. The shell may also be made of or contain a mixture of organic and inorganic luminescent substances. In one embodiment, a mixture of organic and inorganic substances is applied outside the shell.

In one embodiment, a layer, coating, or particles of inorganic and/or organic luminescent substances such as phosphor is located on part or all of the exterior wall surfaces of the detector shell. The photons of light pass through the shell or wall(s) of the detector shell and excite the organic or inorganic photoluminescent phosphor located outside of the detector shell. Typically this is red, blue, or green light. However, phosphors may be used which emit other light such as white, pink, or yellow light. In some embodiments, the emitted light may not be visible to the human eye. Up-conversion or down-conversion phosphors may be used.

The phosphor may be located on the outside surface of each detector shell. In this embodiment, the outside surface is at least partially covered with phosphor that emits light in the visible or invisible range when excited by photons from the gas discharge within the detector shell and/or by photons emitted from an excited phosphor. The phosphor may emit light in the visible, UV, and/or IR range.

The phosphor can be dispersed and/or suspended within the ionizable gas inside each detector shell. In such embodiment, the phosphor particles are sufficiently small such that most of the phosphor particles remain suspended within the gas and do not precipitate or otherwise substantially collect on the inside wall of the detector shell. The average diameter of the dispersed and/or suspended phosphor particles is less than about 1 micron, typically less than 0.1 microns. Larger particles can be used depending on the size of the detector shell. The phosphor particles may be introduced by means of a fluidized bed.

The luminescent substance such as an inorganic and/or organic luminescent phosphor may be located on all or part of the external surface of the detector shells and/or on all or part of the internal surface of the detector shell. The phosphor may comprise particles dispersed or floating within the gas. In another embodiment, the luminescent substance is incorporated into the shell of the detector shell.

The inorganic and/or organic luminescent substance may be located on the external surface and excited by photons from the gas discharge inside the detector shell and/or by photons emitted from an excited phosphor. The phosphor emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors.

The phosphor thickness is sufficient to absorb the UV, but thin enough to emit light with minimum attenuation. Typically the phosphor thickness is about 2 to 40 microns, preferably about 5 to 15 microns. In one embodiment, dispersed or floating particles within the gas are typically spherical or needle shaped having an average size of about 0.01 to 5 microns.

A UV photoluminescent phosphor is excited by UV in the range of about 50 to about 400 nanometers. The phosphor may have a protective layer or coating which is transmissive to the excitation UV and the emitted visible light. Such include organic films such as perylene or inorganic films such as aluminum oxide or silica.

Two or more layers of luminescent material are contemplated. Such layers may be the same organic or inorganic luminescent material or the layers may be of different luminescent materials. Layers of organic and organic, inorganic and inorganic, or organic and inorganic luminescent materials are contemplated. The photons emitted by one luminescent material may be used to excite another luminescent material of the same or identical composition. In one embodiment, photons from one layer of luminescent material excite another layer of luminescent material of the same or identical material.

Matching of Gas and Luminescent Material

The gas mixture or composition and gas pressure may be matched for each phosphor in a detector plasma-shell. In the prior art, it is necessary to select an ionizable gas mixture and gas pressure that is optimum for all phosphors used in the device such as red, blue, and green phosphors. However, this requires trade-offs because a particular gas mixture may be optimum for a particular green phosphor, but less desirable for red or blue phosphors. In addition, trade-offs are required for the gas pressure. In the practice of this invention, an optimum gas mixture and an optimum gas pressure may be provided for each detector shell and the selected phosphors. Thus the gas mixture and gas pressure inside each detector shell may be optimized with a custom gas mixture and a custom gas pressure, each or both optimized for each phosphor, for example emitting red, blue, green, white, pink, or yellow light in the visible range or light in the invisible range. The diameter and the wall thickness of the detector shell can also be adjusted and optimized for each phosphor. Depending upon the Paschen Curve (pd v. voltage) for the particular ionizable gas mixture, the operating voltage may be decreased by optimized changes in the gas mixture, gas pressure, and the dimensions of the detector shell including the distance between electrodes.

Up-Conversion

In one embodiment, there is used an inorganic and/or organic luminescent material or substance such as a Stokes phosphor for up-conversion, for example to convert infrared radiation to visible light. Up-conversion or Stokes materials include phosphors such as disclosed in U.S. Pat. No. 3,623,907 (Watts), U.S. Pat. No. 3,634,614 (Geusic), U.S. Pat. No. 5,541,012 (Ohwaki et al.), U.S. Pat. No. 6,265,825 (Asano), and U.S. Pat. No. 6,624,414 (Glesener), all incorporated herein by reference. Up-conversion may also be obtained with shell compositions such as thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR. Glasses for up-conversion are also disclosed in Japanese Patents 9054562 and 9086958 (Akira et al.), both incorporated herein by reference.

An up-conversion crystalline structure is disclosed by U.S. Pat. No. 5,166,948 (Gavrilovic), incorporated herein by reference. Nano-engineered luminescent materials or substances including both Stokes and Anti-Stokes down-conversion phosphors are disclosed by U.S. Pat. No. 6,726,992 (Yadav et al.), incorporated herein by reference. It is contemplated that the detector shell may be constructed wholly or in part from an up-conversion substance, down-conversion substance, or a combination of both.

Down-Conversion

The luminescent substance may include down-conversion (Anti-Stokes) materials or substances such as phosphors as disclosed in U.S. Pat. No. 3,838,307 (Masi), incorporated herein by reference. Down-conversion luminescent substances are also disclosed in U.S. Pat. No. 6,013,538 (Burrows et al.), U.S. Pat. No. 6,091,195 (Forrest et al.), U.S. Pat. No. 6,208,791 (Bischel et al.), U.S. Pat. No. 6,566,156 (Sturm et al.), and U.S. Pat. No. 6,650,045 (Forrest et al.), all incorporated herein by reference. Down-conversion luminescent substances are also disclosed in U.S. Patent Application Publications 2004/0159903 (Burgener, II et al.), 2004/0196538 (Burgener, II et al.), 2005/0093001 (Liu et al.) and 2005/0094109 (Sun et al.), all incorporated herein by reference. Anti-Stokes phosphors are also disclosed in European Patent 0143034 (Maestro et al.), incorporated herein by reference. As noted above, the detector plasma-shell may be constructed wholly or in part from a down-conversion substance, up-conversion substance or a combination of both.

Quantum Dots

In one embodiment, the luminescent substance is a quantum dot material. Examples of luminescent quantum dots are disclosed in International Publication Numbers WO 03/038011, WO 00/029617, WO 03/038011, WO 03/100833, and WO 03/037788, all incorporated herein by reference. Luminescent quantum dots are also disclosed in U.S. Pat. No. 6,468,808 (Nie et al.), U.S. Pat. No. 6,501,091 (Bawendi et al.), U.S. Pat. No. 6,698,313 (Park et al.), and U.S. Patent Application Publication 2003/0042850 (Bertram et al.), all incorporated herein by reference. The quantum dots may be added or incorporated into the detector plasma-shell during shell formation or after the shell is formed.

Protective Overcoat

Organic luminescent phosphors are particularly suitable for placing on the exterior shell surface, but may require a protective overcoat. The protective overcoat may be inorganic, organic, or a combination of inorganic and organic. This protective overcoat may be an inorganic and/or organic luminescent substance.

The luminescent substance may have a protective overcoat such as a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance.

Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment.

In one embodiment, the luminescent substance is coated with a film or layer of a perylene or parylene compound including monomers, dimers, trimers, polymers, copolymers, and derivatives thereof. The perylene or parylene compounds are widely used as protective films. Specific compounds include poly-monochloro-para-xylyene (Parylene C) and poly-para-xylylene (Parylene N). Parylene polymer films are also disclosed in U.S. Pat. No. 5,879,808 (Wary et al.) and U.S. Pat. No. 6,586,048 (Welch et al.), both incorporated herein by reference. The perylene or parylene compounds may be applied by ink jet printing, screen printing, spraying, and so forth as disclosed in U.S. Patent Application Publication 2004/0032466 (Deguchi et al.), incorporated herein by reference. Parylene conformal coatings are covered by Mil-I-46058C and ISO 9002. Parylene films may also be induced into fluorescence by an active plasma as disclosed in U.S. Pat. No. 5,139,813 (Yira et al.), incorporated herein by reference.

Phosphor overcoats are also disclosed in U.S. Pat. No. 4,048,533 (Hinson et al.), U.S. Pat. No. 4,315,192 (Skwirut et al.), U.S. Pat. No. 5,592,052 (Maya et al.), U.S. Pat. No. 5,604,396 (Watanabe et al.), U.S. Pat. No. 5,793,158 (Wedding), and U.S. Pat. No. 6,099,753 (Yoshimura et al.), all incorporated herein by reference. In some embodiments, the luminescent substance is selected from materials that do not degrade when exposed to oxygen, moisture, sunlight, etc. and that may not require a protective overcoat. Such include various organic luminescent substances such as the perylene or parylene compounds disclosed above. These compounds may be used as protective overcoats and thus do not require a protective overcoat.

Tinted Detector Shells

The detector plasma-shell may be color tinted or constructed of materials that are color tinted with red, blue, green, yellow, or like pigments. This is disclosed in U.S. Pat. No. 4,035,690 (Roeber) cited above and incorporated herein by reference. The gas discharge may also emit color light of different wavelengths as disclosed in Roeber (690). The use of tinted materials and/or gas discharges emitting light of different wavelengths may be used in combination with the above described phosphors and the light emitted from such phosphors. Optical filters may also be used.

Filters

The tiled detector shells may be used with an optical and/or electromagnetic (EMI) filter, screen, and/or shield. The filter, screen, and/or shield are positioned on a tiled structure of detector shells, for example on the front or top-viewing surface. Examples of optical filters, screens, and/or shields are disclosed in U.S. Pat. No. 3,960,754 (Woodcock), U.S. Pat. No. 4,106,857 (Snitzer), U.S. Pat. No. 4,303,298, (Yamashita), U.S. Pat. No. 5,036,025 (Lin), U.S. Pat. No. 5,804,102 (Oi), and U.S. Pat. No. 6,333,592 (Sasa et al.), all incorporated herein by reference. Examples of EMI filters, screens, and/or shields are disclosed in U.S. Pat. No. 6,188,174 (Marutsuka) and U.S. Pat. No. 6,316,110 (Anzaki et al.), incorporated herein by reference. Color filters may also be used. Examples are disclosed in U.S. Pat. No. 3,923,527 (Matsuura et al.), U.S. Pat. No. 4,105,577 (Yamashita), U.S. Pat. No. 4,110,245 (Yamashita), and U.S. Pat. No. 4,615,989 (Ritze), all incorporated herein by reference. Each detector shell may be separately filtered.

IR Filters

The tiled detector shell structure may contain an infrared (IR) filter. An IR filter may be selectively used with one or more shells to absorb or reflect IR emissions from the display. Such IR emissions may come from the gas discharge inside a detector shell and/or from a luminescent substance located inside and/or outside of a detector shell. An IR filter is necessary if the device is used in a night vision application. With night vision, it is typically necessary to filter near IR from about 650 nm (nanometers) or higher, generally about 650 nm to about 900 nm. In some embodiments the detector shell may comprise an IR filter material. The detector shell may be made from an IR filter material.

Examples of IR filter materials include cyanine compounds such as phthalocyanine and naphthalocyanine compounds as disclosed in U.S. Pat. No. 5,804,102 (Oi et al.), U.S. Pat. No. 5,811,923 (Zieba et al.), and U.S. Pat. No. 6,297,582 (Hirota et al.), all incorporated herein by reference. The IR compound may also be an organic dye compound such as anthraquinone as disclosed in Hirota et al. (582) and tetrahedrally coordinated transition metal ions of cobalt and nickel as disclosed in U.S. Pat. No. 7,081,991 (Jones et al.), incorporated herein by reference.

Optical Interference Filter

The filter may comprise an optical interference filter comprising a layer of low refractive index material and a layer of high refractive index material, as disclosed in U.S. Pat. No. 4,647,812 (Vriens et al.) and U.S. Pat. No. 4,940,636 (Brock et al.), both incorporated herein by reference. In one embodiment, each plasma-shell is composed of a low refraction index material and a high refraction index material. Examples of low refractive index materials include magnesium fluoride and silicon dioxide such as amorphous $SiO_2$. Examples of high refractive index materials include tantalum oxide and titanium oxide. In one embodiment, the high refractive index material is titanium oxide and at least one metal oxide selected from zirconium oxide, hafnium oxide, tantalum oxide, magnesium oxide, and calcium oxide.

Layers of Luminescent Substances

Two or more layers of the same or different luminescent substances may be selectively applied to the detector shells. Such layers may comprise combinations of organic and organic, inorganic and inorganic, and/or inorganic and organic.

Combinations of Detector Plasma-Shells

Combinations of detector plasma-shells of different geometric shapes may be used on the tiled substrates including plasma-shell pairs such as plasma-spheres and plasma-discs, plasma-spheres and plasma-domes, and plasma-discs and plasma-domes. Also combinations of three or more may be used. Plasma-shells of different geometric shapes may be used with selected organic and/or inorganic luminescent substances to provide one color and plasma-shells of different geometric shape(s) used with other organic and/or inorganic luminescent substances to provide other colors.

Stacking of Detector Plasma-Shells

Detector plasma-shells of the same or different geometric shape may be stacked on top of each other or arranged in parallel side-by-side positions on the tiled substrates. This stacking embodiment may be practiced with plasma-shells that use selected phosphors and/or color emitting gases such as the excimer gases.

Detector Plasma-Shells Combined with Plasma-Tubes

The tiled substrates may comprise a combination of detector plasma-shells and plasma-tubes. Plasma-tubes comprise elongated tubes for example as disclosed in U.S. Pat. No. 3,602,754 (Pfaender et al.), U.S. Pat. No. 3,654,680 (Bode et al.), U.S. Pat. No. 3,927,342 (Bode et al.), U.S. Pat. No. 4,038,577 (Bode et al.), U.S. Pat. No. 3,969,718 (Strom), U.S. Pat. No. 3,990,068 (Mayer et al.), U.S. Pat. No. 4,027,188 (Bergman), U.S. Pat. No. 5,984,747 (Bhagavatula et al.), U.S. Pat. No. 6,255,777 (Kim et al.), U.S. Pat. No. 6,633,117 (Shinoda et al.), U.S. Pat. No. 6,650,055 (Ishimoto et al.), and U.S. Pat. No. 6,677,704 (Ishimoto et al.), all incorporated herein by reference. Both AC and DC gas discharge tubes are contemplated. Plasma-shells of different geometric shapes may be used in combination with plasma-tubes of different geometric shapes.

The elongated plasma-tube is intended to include capillary, filament, filamentary, illuminator, hollow rod, or other such terms. It includes an elongated enclosed gas filled structure having a length dimension that is greater than its cross-sectional width dimension. A plasma-tube has multiple gas discharge pixels of 100 or more, typically 500 to 1000 or more, whereas a plasma-shell typically has only one gas discharge pixel. In some embodiments, a plasma-shell may comprise more than one pixel, i.e., 2, 3, or 4 pixels up to about 10 pixels.

The length of each plasma-tube will vary depending upon the substrate. In one embodiment hereof, an elongated tube is selectively divided into a multiplicity of lengths. In another embodiment, there is used a continuous tube that winds or weaves back and forth from one end to the other end of the substrate.

The plasma-tubes may be arranged in any configuration. In one embodiment, there are alternative rows of plasma-shells and plasma-tubes. The plasma-tubes may be used for any desired function or purpose including the priming or conditioning of the plasma-shells. In one embodiment, the plasma-tubes are arranged around the perimeter of the device to provide priming or conditioning of the plasma-shells. The plasma-tubes may be of any geometric cross-section including circular, elliptical, square, rectangular, triangular, polygonal, trapezoidal, pentagonal, or hexagonal. The gas discharge tubes may be made of a variety of materials as listed above for the detector shells. The tubes may contain secondary electron emission materials, luminescent substances, and reflective materials as discussed herein for detector shells. The tubes and shells may also utilize positive column discharge. Tubes with positive column discharge are disclosed in U.S. Pat. Nos. 7,122,961 and 7,157,854 issued to Carol Ann Wedding, both incorporated herein by reference.

SUMMARY

Although this invention has been disclosed and described herein with reference to dot matrix gas discharge devices, it may also be used in an alphanumeric gas discharge device using segmented electrodes. This invention may be practiced in AC or DC gas discharge devices including hybrid structures of both AC and DC gas discharge. In some embodiments, the tiled substrates may contain detector shells of other substances such as an electroluminescent (EL) materials, liquid crystal materials, field emission materials, electrophoretic materials, and Organic EL, or Organic LED materials.

In one embodiment, the tiled substrates containing detector shells are used to detect radiation such as nuclear radiation from a nuclear device, mechanism, apparatus or container as disclosed in U.S. Pat. No. 7,375,342 (Wedding), incorporated herein by reference. This is particularly suitable for detecting hidden nuclear devices at airports, ship holds, loading docks, bridges, and other such locations.

The use of the encapsulated detector shells on a tiled structure having a flexible or bendable substrate allows the device to be utilized in a number of other applications. In one application, the tiled device is used as a shield to absorb electromagnetic radiation and to make the shielded object invisible to enemy radar. In this embodiment, a sheet of tiled substrates containing shells is provided as a blanket, shield, or roof over the object. The substrate can be used to completely cover or envelop the object.

The tiled substrates containing detector shells can also be configured as sensors. This includes microwave and radiation sensors. The shells can be used alone or without electrodes for microwave sensing and radiation sensing. Additionally, the shells can act as reflectors of microwave energy, such as a shield against direct energy weapons. These can also be used as a reflector or transmitter of microwave radiation for antenna and radar applications.

The tiled substrates containing plasma-shells can also be used as an antenna, for example as disclosed in U.S. Pat. No. 7,474,273 (Pavliscak et al.), incorporated herein by reference.

The tiled substrates containing shells may be used in a photovoltaic solar cell. In this application, the shells contain materials for conversion of sunlight to electrical energy.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In a gas discharge radiation detection device, the improvement wherein the detection device comprises a dome structure made of a multiplicity of single substrates tiled and sealed together edge to edge to form the dome structure, said tiled dome structure being self-supported by the tiled and sealed substrates, each substrate containing a multiplicity of hollow radiation detecting plasma-shells, each plasma-shell being filled with a gas that ionizes or discharges from detected radiation each plasma-shell being located on a surface of a tiled substrate, each plasma-shell encapsulating the gas independently of a substrate.

2. The detection device of claim 1 wherein each plasma-shell is a plasma-sphere, plasma-disc, plasma-dome, plasma-cube, or plasma-cuboid.

3. The detection device of claim 1 wherein the tiled substrates are triangular in shape.

4. The detection device of claim 1 wherein the tiled substrates are hexagonal in shape.

5. The detection device of claim 1 wherein each plasma-shell is attached to one or more electrodes.

6. The detection device of claim 1 wherein each plasma-shell contains a radiation detection material.

7. The detection device of claim 6 wherein the radiation detection material is a compound of lithium, boron, cadmium, or gadolinium.

8. The detection device of claim 1 wherein one or more plasma-shell is made of a radiation detection material.

9. The detection device of claim 8 wherein the radiation detection material is a compound of lithium, boron, cadmium, or gadolinium.

10. A gas discharge radiation detector dome formed by multiple single substrates tiled and sealed together edge to edge, each single tiled substrate containing a multiplicity of hollow radiation detection plasma-shells filled with a gas that produces photons during gas discharge or ionizes when radiation is detected, each said plasma-shell being located on a surface of a single tiled substrate, said dome being formed and supported by the tiled and sealed substrates.

11. The detector dome of claim 10 wherein each plasma-shell is a plasma-sphere, plasma-disc, plasma-dome, plasma-cube, or plasma-cuboid.

12. The detector dome of claim 10 wherein the tiled substrates are triangular in shape.

13. The detector dome of claim 10 wherein the tiled substrates are hexagonal in shape.

14. The detector dome of claim 10 wherein each plasma-shell is attached to one or more electrodes.

15. The detector dome of claim 14 wherein each electrode is connected to electronic circuitry that includes a radiation read-out and/or recording device.

16. The detector dome of claim 10 wherein each plasma-shell contains a radiation detection material.

17. The detector dome of claim 16 wherein the radiation detection material is a compound of lithium, boron, cadmium, or gadolinium.

18. The detection device of claim 10 wherein one or more plasma-shell is made of a radiation detection material.

19. The detector dome of claim 18 wherein the radiation detection material is a compound of lithium, boron, cadmium, or gadolinium.

20. A gas discharge radiation detection device comprising a multiplicity of single substrates tiled and sealed together edge to edge to form a dome structure that is formed and supported by the tiled and sealed substrates, each single substrate containing multiple gas-filled plasma-shells positioned on a surface of the substrate for the detection of radiation, each plasma-shell encapsulating the gas independently of the substrate.

* * * * *